(12) United States Patent
Shpakoff et al.

(10) Patent No.: US 7,229,950 B2
(45) Date of Patent: Jun. 12, 2007

(54) METHOD AND COMPOSITION FOR ENHANCED HYDROCARBONS RECOVERY

(75) Inventors: Paul Gregory Shpakoff, Houston, TX (US); Kirk Herbert Raney, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/408,118

(22) Filed: Apr. 20, 2006

(65) Prior Publication Data

US 2006/0189486 A1    Aug. 24, 2006

Related U.S. Application Data

(62) Division of application No. 10/385,578, filed on Mar. 11, 2003, now Pat. No. 7,055,602.

(51) Int. Cl.
*E21B 21/00* (2006.01)
*E21B 43/22* (2006.01)
*C09K 8/524* (2006.01)

(52) U.S. Cl. .................. 507/218; 507/203; 507/209; 166/244.1; 166/270.1

(58) Field of Classification Search ................ 507/203
See application file for complete search history.

(56) References Cited

U.S. PATENT DOCUMENTS

| | | | |
|---|---|---|---|
| 3,811,504 A | 5/1974 | Flournoy et al. | 166/273 |
| 3,811,505 A | 5/1974 | Flournoy et al. | 166/274 |
| 3,943,160 A | 3/1976 | Farmer, III et al. | 260/458 |
| 3,945,437 A | 3/1976 | Chiu et al. | 166/305 R |
| 3,946,812 A | 3/1976 | Gale et al. | 166/274 |
| 4,077,471 A | 3/1978 | Shupe et al. | 166/275 |
| 4,216,079 A | 8/1980 | Newcombe | 208/188 |
| 4,313,847 A | 2/1982 | Chasin et al. | 252/356 |
| 4,825,951 A | 5/1989 | Balzer | 166/274 |
| 4,853,138 A | 8/1989 | Loza et al. | 252/8.554 |
| 4,985,154 A | 1/1991 | Balzer et al. | 252/8.554 |
| 5,076,363 A | 12/1991 | Kalpakci et al. | 166/273 |
| 5,103,909 A | 4/1992 | Morgenthaler et al. | 166/288 |
| 5,199,490 A | 4/1993 | Surles et al. | 166/270 |
| 5,284,206 A | 2/1994 | Surles et al. | 166/270 |
| 5,318,709 A | 6/1994 | Wuest et al. | 252/8.554 |
| H001467 H * | 8/1995 | Prieto et al. | 510/340 |
| 5,510,306 A | 4/1996 | Murray | 502/64 |
| 5,634,984 A | 6/1997 | Van Slyke | 134/40 |
| 5,648,584 A | 7/1997 | Murray | 585/666 |
| 5,648,585 A | 7/1997 | Murray et al. | 585/671 |
| 5,654,261 A | 8/1997 | Smith | 507/269 |
| 5,723,423 A | 3/1998 | Van Slyke | 510/188 |
| 5,849,960 A | 12/1998 | Singleton et al. | 568/909 |
| 6,022,834 A | 2/2000 | Hsu et al. | 507/259 |
| 6,150,222 A | 11/2000 | Gardner et al. | 438/300 |
| 6,222,077 B1 | 4/2001 | Singleton | 568/909 |
| 6,269,881 B1 | 8/2001 | Chou et al. | 166/270.1 |
| 6,427,268 B1 | 8/2002 | Davis | 5/490 |
| 6,439,308 B1 | 8/2002 | Wang | 166/270 |
| 6,448,435 B1 | 9/2002 | Jacobson et al. | 562/39 |
| 6,462,215 B1 | 10/2002 | Jacobson et al. | 558/41 |

FOREIGN PATENT DOCUMENTS

GB    1484326    9/1977

OTHER PUBLICATIONS

"Low Surfactant Concentration Enhanced Waterflooding," by Willington et al., Society of Petroleum Engineers, 1995.
Ciba Extractive and Process Technologies Web Page, Dec. 4, 2002.
"Low Surfactant Concentration Enhanced Waterflooding," by S. L. Wellington and E. A. Richardson, SPE Annual Technical Conference & Exhibition, Oct. 22-25, 1995.
"The Reservoir Engineering Aspects of Waterflooding," by Craig, Jr., 1971 Monograph vol. 3, Society ofPetroelum Engineers, pp. 12-28.
"The Earning Power of Potential Tertiarya Surfactant Enhanced Water Flooding Projects," by Myron Kuhlman, M K Tech Solutions, Chemical, Environmental and Petroleum Technology, Oct. 15, 2001.
"Low Surfactant Concentration Enhanced Waterflooding," by S. L. Wellington and E. A. Richardson, Paper presented at SPE Annual Technical Conference & Exhibition, Dallas, Texas, Oct. 22-25, 1995, pp. 475-490.

* cited by examiner

*Primary Examiner*—Randy Gulakowski
*Assistant Examiner*—Timothy J. Kugel

(57) ABSTRACT

A method of treating a hydrocarbon containing formation is described. The method may include providing a hydrocarbon recovery composition to the hydrocarbon containing formation. Hydrocarbons in the hydrocarbon containing formation may interact with the hydrocarbon recovery composition. The hydrocarbon recovery composition may include an aliphatic anionic surfactant and an aliphatic nonionic additive. In some embodiments, an aliphatic anionic surfactant may be branched. In other embodiments, an aliphatic nonionic additive may be branched.

24 Claims, 5 Drawing Sheets

METHOD AND COMPOSITION FOR ENHANCED HYDROCARBONS RECOVERY

This application is a divisional application of U.S. Ser. No. 10/385,578, filed Mar. 11, 2003, now U.S. Pat. No. 7,055,602.

BACKGROUND OF THE INVENTION

1. Field of Invention

The present invention generally relates to methods for recovery of hydrocarbons from hydrocarbon formations. More particularly, embodiments described herein relate to methods of enhanced hydrocarbons recovery and to compositions useful therein.

2. Description of Related Art

Hydrocarbons may be recovered from hydrocarbon containing formations by penetrating the formation with one or more wells. Hydrocarbons may flow to the surface through the wells. Conditions (e.g., permeability, hydrocarbon concentration, porosity, temperature, pressure) of the hydrocarbon containing formation may affect the economic viability of hydrocarbon production from the hydrocarbon containing formation. A hydrocarbon containing formation may have natural energy (e.g., gas, water) to aid in mobilizing hydrocarbons to the surface of the hydrocarbon containing formation. Natural energy may be in the form of water. Water may exert pressure to mobilize hydrocarbons to one or more production wells. Gas may be present in the hydrocarbon containing formation at sufficient pressures to mobilize hydrocarbons to one or more production wells. The natural energy source may become depleted over time. Supplemental recovery processes may be used to continue recovery of hydrocarbons from the hydrocarbon containing formation. Examples of supplemental processes include waterflooding, polymer flooding, alkali flooding, thermal processes, solution flooding or combinations thereof.

Compositions and methods for enhanced hydrocarbons recovery are described in U.S. Pat. No. 3,943,160 to Farmer et al., entitled "Heat-Stable Calcium-Compatible Waterflood Surfactant;" U.S. Pat. No. 3,946,812 to Gale et al., entitled "Use Of Materials As Waterflood Additives;" U.S. Pat. No. 4,077,471 to Shupe et al., entitled "Surfactant Oil Recovery Process Usable In High Temperature, High Salinity Formations;" U.S. Pat. No. 4,216,079 to Newcombe, entitled "Emulsion Breaking With Surfactant Recovery;" U.S. Pat. No. 5,318,709 to Wuest et al., entitled "Process for the Production of Surfactant Mixtures Based On Ether Sulfonated And Their Use;" U.S. Pat. No. 5,723,423 to Van Slyke, entitled "Solvent Soaps and Methods Employing Same;" U.S. Pat. No. 6,022,834 to Hsu et al., entitled "Alkaline Surfactant Polymer Flooding Composition and Process;" U.S. Pat. No. 6,269,881 to Chou et al., entitled "Oil Recovery Method For Waxy Crude Oil Using Alkylaryl Sulfonate Surfactants Derived From Alpha-Olefins and the Alpha-Olefin Compositions" and by Wellington, et al. in "Low Surfactant Concentration Enhanced Waterflooding," Society of Petroleum Engineers, 1995; all of which are incorporated by reference herein.

SUMMARY

In an embodiment, hydrocarbons may be produced from a hydrocarbon containing formation by a method that includes treating at least a portion of the hydrocarbon containing formation with a hydrocarbon recovery composition. In certain embodiments, at least a portion of the hydrocarbon containing formation may be oil wet. In some embodiments, at least a portion of the hydrocarbon formation may include low salinity water. In other embodiments, at least a portion of the hydrocarbon containing formation may exhibit an average temperature of less than about 50° C. Fluids, substances or combinations thereof may be added to at least a portion of the hydrocarbon containing formation to aid in mobilizing hydrocarbons to one or more production wells in certain embodiments.

In one embodiment, a hydrocarbon recovery composition may include an aliphatic nonionic additive and an aliphatic anionic surfactant. In certain embodiments, the aliphatic anionic surfactant may be a sulfuric acid salt. In other embodiments, the aliphatic anionic surfactant may be a phosphoric acid salt. In some embodiments, the aliphatic nonionic additive may be a long chain aliphatic alcohol. The aliphatic nonionic additive and/or the aliphatic anionic surfactant may have branched structures.

The aliphatic group of the aliphatic anionic surfactant may have an average carbon number from 10 to 24. As used herein, the phrase "carbon number" refers to the total number of carbons in a molecule. In certain embodiments, an average carbon number of an aliphatic group of the aliphatic anionic surfactant may range from 12 to 18. In other embodiments, an average carbon number of the aliphatic anionic surfactant may range from 16 to 17. The aliphatic group of the aliphatic anionic surfactant may be branched. The branched aliphatic group of the aliphatic anionic surfactant may include less than about 0.5 percent quaternary carbon atoms. An average number of branches per aliphatic group of the aliphatic anionic surfactant may range between about 0.7 and about 2.5, in some embodiments. Branches on the aliphatic group of the aliphatic anionic surfactant may include, but are not limited to, methyl and/or ethyl branches.

The aliphatic group of the aliphatic nonionic additive may have an average carbon number from 10 to 24. In certain embodiments, an average carbon number of an aliphatic group of an aliphatic nonionic additive may range from 12 to 18. In other embodiments, an average carbon number of an aliphatic group of an aliphatic nonionic additive may range from 16 to 17. The aliphatic group of the aliphatic nonionic additive may be branched. The branched aliphatic group of the aliphatic nonionic additive may include less than about 0.5 percent quaternary carbon atoms. An average number of branches per aliphatic group of the aliphatic nonionic additive may range between about 0.7 and about 2.5, in some embodiments. Branches on the aliphatic group of the aliphatic nonionic additive may include, but are not limited to, methyl and/or ethyl branches.

In an embodiment, a hydrocarbon recovery composition may be made by combining an aliphatic nonionic additive with an aliphatic anionic surfactant. The aliphatic nonionic additive and/or the aliphatic anionic surfactant may have branched structures. In some embodiments, an aliphatic nonionic additive may be a long chain aliphatic alcohol. In other embodiments, an aliphatic anionic surfactant may be a long chain aliphatic acid salt. In certain embodiments, a long chain aliphatic alcohol may be combined with a long chain acid salt at temperatures less than the decomposition temperature of the long chain acid salt. An amount of long chain acid salt in the composition may be greater than 40 weight percent based of the total weight of the composition. In some embodiments, an amount of long chain aliphatic alcohol may be less than 60 weight percent of the total weight of the composition.

In an embodiment, a hydrocarbon containing composition may be produced from a hydrocarbon containing formation. The hydrocarbon containing composition may include any combination of hydrocarbons, an aliphatic nonionic additive, an aliphatic anionic surfactant, methane, water, asphaltenes, carbon monoxide and ammonia. In certain embodiments, an aliphatic nonionic additive may be a long chain aliphatic alcohol. The aliphatic nonionic additive and/or the aliphatic anionic surfactant may have branched structures. In some embodiments, an aliphatic anionic surfactant may be a long chain aliphatic acid salt.

BRIEF DESCRIPTION OF THE DRAWINGS

Advantages of the present invention will become apparent to those skilled in the art with the benefit of the following detailed description of embodiment and upon reference to the accompanying drawings, in which.

Figure 1:
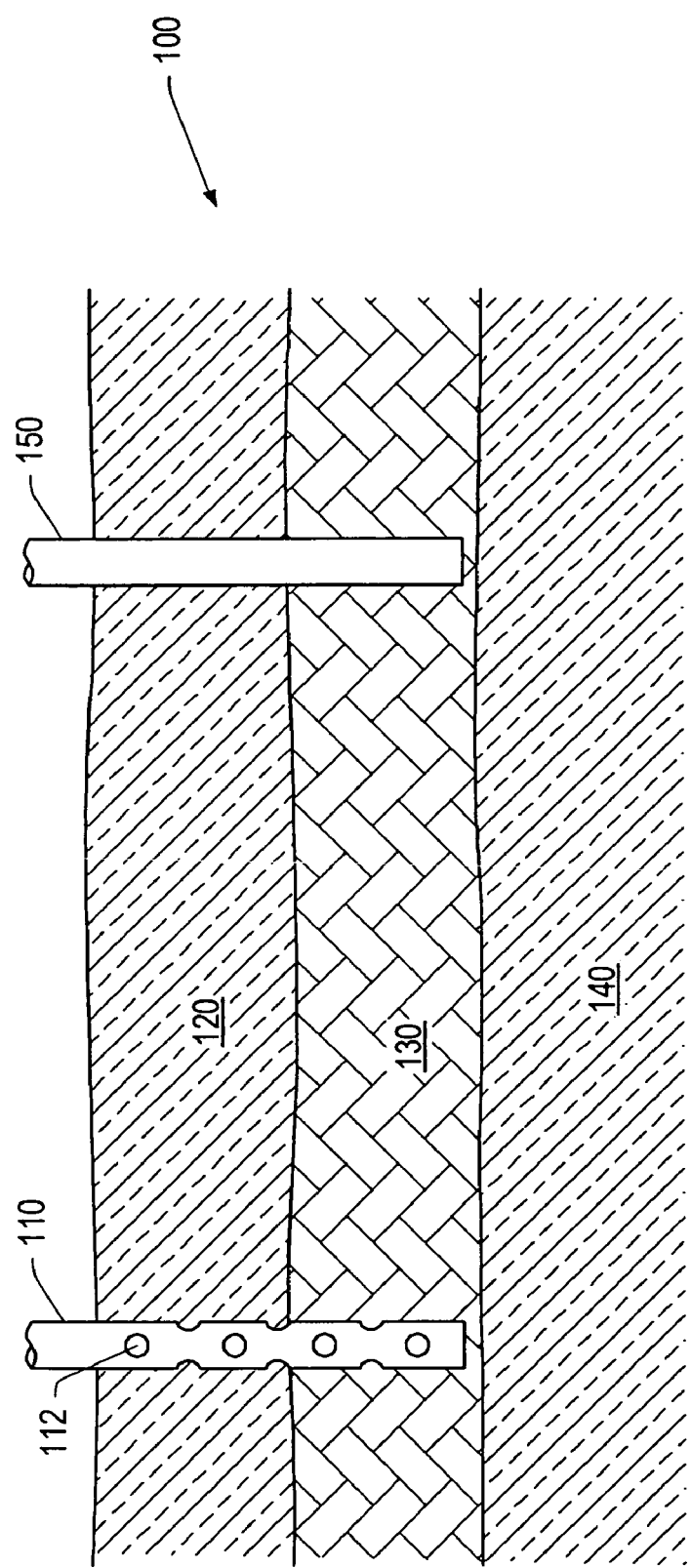
FIG. 1 depicts an embodiment of treating a hydrocarbon containing formation.

While the invention is susceptible to various modifications and alternative forms, specific embodiments thereof are shown by way of example in the drawings and will herein be described in detail. It should be understood that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Hydrocarbons may be produced from hydrocarbon formations through wells penetrating a hydrocarbon containing formation. "Hydrocarbons" are generally defined as molecules formed primarily of carbon and hydrogen atoms. Hydrocarbons may also include other elements, such as, but not limited to, halogens, metallic elements, nitrogen, oxygen and/or sulfur. Hydrocarbons derived from a hydrocarbon formation may include, but are not limited to, kerogen, bitumen, pyrobitumen, asphaltenes, oils or combinations thereof. Hydrocarbons may be located within or adjacent to mineral matrices within the earth. Matrices may include, but are not limited to, sedimentary rock, sands, silicilytes, carbonates, diatomites and other porous media.

A "formation" includes one or more hydrocarbon containing layers, one or more non-hydrocarbon layers, an overburden and/or an underburden. An "overburden" and/or an "underburden" includes one or more different types of impermeable materials. For example, overburden/underburden may include rock, shale, mudstone, or wet/tight carbonate (i.e., an impermeable carbonate without hydrocarbons). For example, an underburden may contain shale or mudstone. In some cases, the overburden/underburden may be somewhat permeable. For example, an underburden may be composed of a permeable mineral such as sandstone or limestone. In some embodiments, at least a portion of a hydrocarbon containing formation may exist at less than 1000 feet below the earth's surface.

Properties of a hydrocarbon containing formation may affect how hydrocarbons flow through an underburden/overburden to one or more production wells. Properties include, but are not limited to, porosity, permeability, pore size distribution, surface area, salinity or temperature of formation. Overburden/underburden properties in combination with hydrocarbon properties, such as, capillary pressure (static) characteristics and relative permeability (flow) characteristics may effect mobilization of hydrocarbons through the hydrocarbon containing formation.

Permeability of a hydrocarbon containing formation may vary depending on the formation composition. A relatively permeable formation may include heavy hydrocarbons entrained in, for example, sand or carbonate. "Relatively permeable," as used herein, refers to formations or portions thereof, that have an average permeability of 10 millidarcy or more. "Relatively low permeability" as used herein, refers to formations or portions thereof that have an average permeability of less than about 10 millidarcy. One darcy is equal to about 0.99 square micrometers. An impermeable portion of a formation generally has a permeability of less than about 0.1 millidarcy. In some cases, a portion or all of a hydrocarbon portion of a relatively permeable formation may include predominantly heavy hydrocarbons and/or tar with no supporting mineral grain framework and only floating (or no) mineral matter (e.g., asphalt lakes).

Fluids (e.g., gas, water, hydrocarbons or combinations thereof) of different densities may exist in a hydrocarbon containing formation. A mixture of fluids in the hydrocarbon containing formation may form layers between an underburden and an overburden according to fluid density. Gas may form a top layer, hydrocarbons may form a middle layer and water may form a bottom layer in the hydrocarbon containing formation. The fluids may be present in the hydrocarbon containing formation in various amounts. Interactions between the fluids in the formation may create interfaces or boundaries between the fluids. Interfaces or boundaries between the fluids and the formation may be created through interactions between the fluids and the formation. Typically, gases do not form boundaries with other fluids in a hydrocarbon containing formation. In an embodiment, a first boundary may form between a water layer and underburden. A second boundary may form between a water layer and a hydrocarbon layer. A third boundary may form between hydrocarbons of different densities in a hydrocarbon containing formation. Multiple fluids with multiple boundaries may be present in a hydrocarbon containing formation, in some embodiments. It should be understood, that many combinations of boundaries between fluids and between fluids and the overburden/underburden may be present in a hydrocarbon containing formation.

Production of fluids may perturb the interaction between fluids and between fluids and the overburden/underburden. As fluids are removed from the hydrocarbon containing formation, the different fluid layers may mix and form mixed fluid layers. The mixed fluids may have different interactions at the fluid boundaries. Depending on the interactions at the boundaries of the mixed fluids, production of hydrocarbons may become difficult. Quantification of the interactions (e.g., energy level) at the interface of the fluids and/or fluids and overburden/underburden may be useful to predict mobilization of hydrocarbons through the hydrocarbon containing formation.

Quantification of energy required for interactions (e.g., mixing) between fluids within a formation at an interface may be difficult to measure. Quantification of energy levels at an interface between fluids may be determined by generally known techniques (e.g., spinning drop tensiometer). Interaction energy requirements at an interface may be referred to as interfacial tension. "Interfacial tension" as used herein, refers to a surface free energy that exists between two or more fluids that exhibit a boundary. A high interfacial tension value (e.g., greater than about 10 dynes/cm) may indicate the inability of one fluid to mix with a second fluid to form a fluid emulsion. As used herein, an "emulsion" refers to a dispersion of one immiscible fluid into a second fluid by addition of a composition that reduces the interfacial tension between the fluids to achieve stability. The inability of the fluids to mix may be due to high surface interaction energy between the two fluids. Low interfacial tension values (e.g., less than about 1 dyne/cm) may indicate less surface interaction between the two immiscible fluids. Less surface interaction energy between two immiscible fluids may result in the mixing of the two fluids to form an emulsion. Fluids with low interfacial tension values may be mobilized to a well bore due to reduced capillary forces and subsequently produced from a hydrocarbon containing formation.

Fluids in a hydrocarbon containing formation may wet (e.g., adhere to an overburden/underburden or spread onto an overburden/underburden in a hydrocarbon containing formation). As used herein, "wettability" refers to the preference of a fluid to spread on or adhere to a solid surface in a formation in the presence of other fluids. Methods to determine wettability of a hydrocarbon formation are described by Craig, Jr. in "The Reservoir Engineering Aspects of Waterflooding", 1971 Monograph Volume 3, Society of Petroleum Engineers. In an embodiment, hydrocarbons may adhere to sandstone in the presence of gas or water. An overburden/underburden that is substantially coated by hydrocarbons may be referred to as "oil wet." An overburden/underburden may be oil wet due to the presence of polar and/or heavy hydrocarbons (e.g., asphaltenes) in the hydrocarbon containing formation. Formation composition (e.g., silica, carbonate or clay) may determine the amount of adsorption of hydrocarbons on the surface of an overburden/underburden. In some embodiments, a porous and/or permeable formation may allow hydrocarbons to more easily wet the overburden/underburden. A substantially oil wet overburden/underburden may inhibit hydrocarbon production from the hydrocarbon containing formation. In certain embodiments, an oil wet portion of a hydrocarbon containing formation may be located at less than 1000 feet below the earth's surface. For example, oil wet formations may be located in Canada, China, Wyoming, Oklahoma and Louisiana.

A hydrocarbon formation may include water. Water may interact with the surface of the underburden. As used herein, "water wet" refers to the formation of a coat of water on the surface of the overburden/underburden. A water wet overburden/underburden may enhance hydrocarbon production from the formation by preventing hydrocarbons from wetting the overburden/underburden. In certain embodiments, a water wet portion of a hydrocarbon containing formation may include minor amounts of polar and/or heavy hydrocarbons.

Water in a hydrocarbon containing formation may contain minerals (e.g., minerals containing barium, calcium, or magnesium) and mineral salts (e.g., sodium chloride, potassium chloride, magnesium chloride). Water salinity and/or water hardness of water in a formation may affect recovery of hydrocarbons in a hydrocarbon containing formation. As used herein "salinity" refers to an amount of dissolved solids in water. "Water hardness," as used herein, refers to a concentration of divalent ions (e.g., calcium, magnesium) in the water. Water salinity and hardness may be determined by generally known methods (e.g., conductivity, titration). As used herein, "high salinity water" refers to water that has greater than about 30,000 ppm total dissolved solids based on sodium chloride. As water salinity increases in a hydrocarbon containing formation, interfacial tensions between hydrocarbons and water may be increased and the fluids may become more difficult to produce.

Low salinity water in a hydrocarbon containing formation may enhance hydrocarbon production from a hydrocarbon containing formation. Hydrocarbons and low salinity water may form a well dispersed emulsion due to a low interfacial tension between the low salinity water and the hydrocarbons. Production of a flowable emulsion (e.g., hydrocarbons/water mixture) from a hydrocarbon containing formation may be more economically viable to a producer. As used herein, "low salinity water" refers to water salinity in a hydrocarbon containing formation that is less than about 20,000 parts per million (ppm) total dissolved solids based on sodium chloride. In some embodiments, hydrocarbon containing formations may include water with a salinity of less than about 13,000 ppm. In certain embodiments, hydrocarbon containing formations may include water with a salinity ranging from about 3,000 ppm to about 10,000 ppm. In other embodiments, salinity of the water in hydrocarbon containing formations may range from about 5,000 ppm to about 8,000 ppm.

A hydrocarbon containing formation may be selected for treatment based on factors such as, but not limited to, thickness of hydrocarbon containing layers within the formation, assessed liquid production content, location of the formation, salinity content of the formation, temperature of the formation, and depth of hydrocarbon containing layers. Initially, natural formation pressure and temperature may be sufficient to cause hydrocarbons to flow into well bores and out to the surface. Temperatures in a hydrocarbon containing formation may range from about 25° C. to about 300° C. A hydrocarbon formation of a depth less than 1000 feet below the earth's surface may exhibit a temperature less than 50° C. In some embodiments, a hydrocarbon formation temperature of a depth less than 1000 feet below the earth's surface may be less than 40° C. In other embodiments, a hydrocarbon formation of a depth less than 1000 feet below the earth's surface temperature may be less than 30° C. As hydrocarbons are produced from a hydrocarbon containing formation, pressures and/or temperatures within the formation may decline. Various forms of artificial lift (e.g., pumps, gas injection) and/or heating may be employed to continue to produce hydrocarbons from the hydrocarbon containing formation. Production of desired hydrocarbons from the hydrocarbon containing formation may become uneconomical as hydrocarbons are depleted from the formation.

Mobilization of residual hydrocarbons retained in a hydrocarbon containing formation may be difficult due to viscosity of the hydrocarbons and capillary effects of fluids in pores of the hydrocarbon containing formation. As used herein "capillary forces" refers to attractive forces between fluids and at least a portion of the hydrocarbon containing formation. In an embodiment, capillary forces may be overcome by increasing the pressures within a hydrocarbon containing formation. In other embodiments, capillary forces may be overcome by reducing the interfacial tension between fluids in a hydrocarbon containing formation. The ability to reduce the capillary forces in a hydrocarbon containing formation may depend on a number of factors, including, but not limited to, the temperature of the hydrocarbon containing formation, the salinity of water in the hydrocarbon containing formation, and the composition of the hydrocarbons in the hydrocarbon containing formation.

As production rates decrease, additional methods may be employed to make a hydrocarbon containing formation more economically viable. Methods may include adding sources of water (e.g., brine, steam), gases, polymers, monomers or any combinations thereof to the hydrocarbon formation to increase mobilization of hydrocarbons.

In an embodiment, a hydrocarbon containing formation may be treated with a flood of water. A waterflood may include injecting water into a portion of a hydrocarbon containing formation through injections wells. Flooding of at least a portion of the formation may water wet a portion of the hydrocarbon containing formation. The water wet portion of the hydrocarbon containing formation may be pressurized by known methods and a water/hydrocarbon mixture may be collected using one or more production wells. The water layer, however, may not mix with the hydrocarbon layer efficiently. Poor mixing efficiency may be due to a high interfacial tension between the water and hydrocarbons.

Production from a hydrocarbon containing formation may be enhanced by treating the hydrocarbon containing formation with a polymer and/or monomer-that may mobilize hydrocarbons to one or more production wells. The polymer and/or monomer may reduce the mobility of the water phase in pores of the hydrocarbon containing formation. The reduction of water mobility may allow the hydrocarbons to be more easily mobilized through the hydrocarbon containing formation. Polymers include, but are not limited to, polyacrylamides, partially hydrolyzed polyacrylamide, polyacrylates, ethylenic copolymers, biopolymers, carboxymethylcellulose, polyvinyl alcohol, polystyrene sulfonates, polyvinylpyrrolidone, AMPS (2-acrylamide-2-methyl propane sulfonate) or combinations thereof. Examples of ethylenic copolymers include copolymers of acrylic acid and acrylamide, acrylic acid and lauryl acrylate, lauryl acrylate and acrylamide. Examples of biopolymers include xanthan gum and guar gum. In some embodiments, polymers may be crosslinked in situ in a hydrocarbon containing formation. In other embodiments, polymers may be generated in situ in a hydrocarbon containing formation. Polymers and polymer preparations for use in oil recovery are described in U.S. Pat. No. 6,427,268 to Zhang et al., entitled "Method For Making Hydrophobically Associative Polymers, Methods of Use and Compositions;" U.S. Pat. No. 6,439,308 to Wang, entitled "Foam Drive Method;" U.S. Pat. No. 5,654,261 to Smith, entitled, "Permeability Modifying Composition For Use In Oil Recovery;" U.S. Pat. No. 5,284,206 to Surles et al., entitled "Formation Treating;" U.S. Pat. No. 5,199,490 to Surles et al., entitled "Formation Treating" and U.S. Pat. No. 5,103,909 to Morgenthaler et al., entitled "Profile Control In Enhanced Oil Recovery," all of which are incorporated by reference herein.

In an embodiment, addition of an additive may increase the solubility of a hydrocarbon recovery composition in a hydrocarbon phase. Alternatively, addition of an additive may increase solubility of the hydrocarbon recovery composition in a water phase. As used herein, a molecule soluble in a hydrocarbon phase may be referred to as "lipophilic." A molecule soluble in a water phase, as used herein, may be referred to as "hydrophilic." The effectiveness of the additive may be measured by combining the additive with a hydrocarbon and water mixture and determining if an emulsion is formed. The effectiveness of the additive to form an emulsion may be reported as a hydrophile-lipophile balance (HLB) number. Typically, HLB numbers range between about 1 and about 40. A high HLB number may indicate that a hydrocarbon-in-water emulsion is formed. A low HLB number may indicate that a water-in-hydrocarbon emulsion is formed. As used herein, a "nonionic additive" refers to an additive that exhibits a hydrophile-lipophile balance (HLB) number of less than 10.

In an embodiment, a hydrocarbon recovery composition may be provided to the hydrocarbon containing formation. In an embodiment, a composition may include one or more nonionic additives (e.g., alcohols, ethoxylated alcohols, nonionic surfactants and /or sugar based esters) and one or more anionic surfactants (e.g., sulfates, sulfonates, ethoxylated sulfates, and/or phosphates).

In an embodiment, an aliphatic nonionic additive may be used in a hydrocarbon recovery composition. As used herein, the term "aliphatic" refers to a straight or branched chain of carbon and hydrogen atoms. In some embodiments, an aliphatic portion of an aliphatic nonionic additive may have an average carbon number from 10 to 24. In some embodiments, an aliphatic portion of an aliphatic nonionic additive may have an average carbon number from 12 to 18. In some embodiments, the aliphatic nonionic additive may include a branched aliphatic portion. A branched aliphatic portion of an aliphatic nonionic additive may have an average carbon number from 16 to 17. In some embodiments, a branched aliphatic group of an aliphatic nonionic additive may have less than about 0.5 percent aliphatic quaternary carbon atoms. In an embodiment, an average number of branches per aliphatic nonionic additive ranges from about 0.1 to about 2.5. In other embodiments, an average number of branches per aliphatic nonionic additive ranges from about 0.7 to about 2.5.

Methyl branches may represent between about 20 percent to about 99 percent of the total number of branches present in the branched nonionic additive. In some embodiments, methyl branches may represent greater than about 50 percent of the total number of branches in a branched nonionic additive. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl or methyl groups.

In an embodiment, an aliphatic nonionic additive may be a long chain aliphatic alcohol. The term "long chain," as used herein, refers to a carbon chain having an average carbon number from 10 to 30. A long chain aliphatic alcohol (e.g., a long chain primary alcohol) may be purchased commercially (e.g., Neodol® alcohols manufactured by Shell Chemical Co., Houston, Tex.). In certain embodiments, a long chain aliphatic alcohol may be prepared by a variety of generally known methods. A long chain aliphatic alcohol may have an average carbon number from 10 to 24. In some embodiments, a long chain aliphatic alcohol may have an average carbon number from 12 to 18. In other embodiments, a long chain aliphatic alcohol may have an average carbon number from 16 to 17.

In an embodiment, a portion of the long chain aliphatic alcohol may be branched. Branched long chain aliphatic alcohols may be prepared by hydroformylation of a branched olefin. Preparations of branched olefins are described in U.S. Pat. No. 5,510,306 to Murray, entitled "Process for Isomerizing Linear Olefins to Isoolefins;" U.S. Pat. No. 5,648,584 to Murray, entitled "Process For Isomerizing Linear Olefins to Isoolefins" and U.S. Pat. 5,648,585 to Murray, entitled "Process For Isomerizing Linear Olefins to Isoolefins," all of which are incorporated by reference herein. Preparations of branched long chain aliphatic alcohols are described in U.S. Pat. No. 5,849,960 to Singleton et al., entitled "Highly Branched Primary Alcohol Compositions, and Biodegradable Detergents Made Therefrom;" U.S. Pat. No. 6,150,222 to Singleton et al., entitled "Highly Branched Primary Alcohol Compositions, and Biodegradable Detergents Made Therefrom;" U.S. Pat. No. 6,222,077 to Singleton et al., entitled "Highly Branched Primary Alcohol Compositions, and Biodegradable Detergents Made Therefrom," all of which are incorporated by reference herein.

In some embodiments, branches of a branched aliphatic group of a long chain aliphatic alcohol may have less than about 0.5 percent aliphatic quaternary carbon atoms. In an embodiment, an average number of branches per long chain aliphatic alcohol ranges from about 0.1 to about 2.5. In other embodiments, an average number of branches per alcohol ranges from about 0.7 to about 2.5.

Methyl branches may represent between about 20 percent to about 99 percent of the total number of branches present in the branched long chain aliphatic alcohol. In some embodiments, methyl branches may represent greater than about 50 percent of the total number of branches in a branched long chain aliphatic alcohol. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl or methyl groups.

In an embodiment, an aliphatic anionic surfactant may be used in a hydrocarbon recovery composition. In certain embodiments, an aliphatic portion of an aliphatic anionic surfactant may have an average carbon number from 10 to 24. In some embodiments, an aliphatic portion of an aliphatic anionic surfactant may have an average carbon number from 12 to 18. In other embodiments, an aliphatic portion of an aliphatic anionic surfactant may have an average carbon number from 16 to 17. In some embodiments, the aliphatic anionic surfactant may include a branched aliphatic portion. In some embodiments, a branched aliphatic group of an aliphatic anionic surfactant may have less than about 0.5 percent aliphatic quaternary carbon atoms. In an embodiment, an average number of branches per aliphatic anionic surfactant ranges from about 0.1 to about 2.5. In other embodiments, an average number of branches per aliphatic anionic surfactant ranges from about 0.7 to about 2.5.

Methyl branches may represent between about 20 percent to about 99 percent of the total number of branches present in the branched anionic surfactant. In some embodiments, methyl branches may represent greater than about 50 percent of the total number of branches in a branched anionic surfactant. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl or methyl groups.

In an embodiment, an aliphatic anionic surfactant may be a long chain acid salt. A long chain acid salt may be represented by the formula $(R-Y)_n M$, where R is a long chain aliphatic group, Y is a sulfuric group $(OSO_3)^-$ or phosphoric group $(OPO_3)^-$; M is an ion; and n is a number depending on the valency of M, such that the total electrical charge of the composition is zero. In certain embodiments, R is branched long chain aliphatic group. Branching of the aliphatic group may improve water solubility of long chain aliphatic anionic surfactants. Long chain anionic surfactant may be substantially surface-active and efficient at reducing interfacial tension. An average carbon number for R may range from 10 to 24. In some embodiments, an average carbon number for R may range from 12 to 18. In other embodiments, an average carbon number for R may range from 16 to 17. M may include, but is not limited to, sodium ion ($Na^+$), potassium ion ($K^+$), magnesium ion ($Mg^{++}$), ammonium ion ($NH_4^+$) or trialkylammonium ion ($R_3NH^+$). In an embodiment, a long chain sulfuric acid salt may be formed when Y is a sulfuric group. In other embodiments, a long chain phosphoric acid salt may be formed when Y is a phosphoric group.

In general, a long chain acid salt may be prepared from a long chain alcohol (e.q., a primary alcohol) by generally known methods or purchased commercially (e.g., Neodol®alcohols manufactured by Shell Chemical Co., Houston, TX). For example, a long chain alcohol may be reacted with sulfur trioxide to form a sulfuric acid or salt. Reaction of a long chain alcohol with polyphosphoric acid or phosphorus pentoxide may form a phosphoric acid or salt. Preparations of branched primary alcohol compositions and long chain acid salts are described in U.S. Pat. No. 5,849,960 to Singleton et al., entitled "Highly Branched Primary Alcohol Compositions, and Biodegradable Detergents Made Therefrom;" U.S. Pat. No. 6,150,222 to Singleton et al., entitled "Highly Branched Primary Alcohol Compositions, and Biodegradable Detergents Made Therefrom;" U.S. Pat. No. 6, 222,077 to Singleton et al., entitled "Highly Branched Primary Alcohol Compositions, and Biodegradable Detergents Made Therefrom;" U.S. Pat. No. 6,462,215 to Jacobson et al., entitled "Sulfonation, Sulfation and Sulfamation"; U.S. Pat. No. 6,448,435 to Jacobson et al., entitled "Sulfonation, Sulfation and Sulfamation" and U.S. Pat. No. 4,313,847 to Chasin et al, entitled "Surfactant Compositions," all of which are incorporated by reference herein.

An aliphatic acid salt may have an aliphatic group with an average carbon number from 10 to 24. In some embodiments, an aliphatic acid salt may have an aliphatic group with an average carbon number from 12 to 18. In other embodiments, an aliphatic acid salt may have an aliphatic group with an average carbon number from 16 to 17. The aliphatic group of the aliphatic acid salt may be branched. In some embodiments, the branches may have less than about 0.5 percent aliphatic quaternary carbon atoms. In an embodiment, an average number of branches per an aliphatic acid salt is from about 0.1 to about 2.5. In other embodiments, an average number of branches is from about 0.7 to about 2.5.

Methyl branches may represent between about 20 percent to about 99 percent of the total number of branches present in the branched aliphatic group of the long chain acid or long chain salt. In some embodiments, methyl branches may represent greater than about 50 percent of the total number of branches in an aliphatic group of a long chain acid or long chain acid salt. The number of ethyl branches in an aliphatic group of a long chain acid or long chain salt may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl or methyl groups.

A hydrocarbons recovery composition may be prepared by combining (e.g., mixing) a nonionic additive (e.g., an aliphatic nonionic additive) with an appropriate amount of an anionic surfactant (e.g., an aliphatic anionic surfactant). Combining of the nonionic additive with the anionic surfactant may be performed at temperatures less than 50° C. In certain embodiments, mixing temperatures may be less than 25° C.

In one embodiment, a hydrocarbon recovery composition may include an aliphatic anionic surfactant and an aliphatic nonionic additive. In some embodiments, an amount of an aliphatic anionic surfactant in a composition may be greater than about 40 wt. % of the total composition. In an embodiment, an amount of an aliphatic anionic surfactant in a hydrocarbon recovery composition main range from about 60 wt. % to about 90 wt. % of the total composition. An amount of an aliphatic anionic surfactant in.a composition may range from about 80 wt. % to about 90 wt. % of the total weight of the composition. An amount of an aliphatic nonionic additive in a composition may be less than about 60 wt. % of the total weight of the composition. The composition may include an amount of an aliphatic nonionic additive from about 10 wt. % to about 40 wt. % of the total weight of the composition. In some embodiments, an amount of an aliphatic nonionic additive may range from about 10 wt. % to about 20 wt. % of the total weight of the composition. The remainder of the composition may include, but is not limited to, water, low molecular weight alcohols, organic solvents, alkyl sulfonates, aryl sulfonates, brine or combinations thereof. Low molecular weight alcohols include, but are not limited to, methanol, ethanol, propanol, isopropyl alcohol, tert-butyl alcohol, sec-butyl alcohol, butyl alcohol, tert-amyl alcohol or combinations thereof. Organic solvents include, but are not limited to, methyl ethyl ketone, acetone, lower alkyl cellosolves, lower alkyl carbitols or combinations thereof.

The aliphatic portion of an aliphatic nonionic additive and an aliphatic nonionic additive used in a hydrocarbon recovery composition may have the same average carbon number, branching and/or number of quaternary carbons. Alternatively, an aliphatic nonionic additive may vary in carbon number, branching, or number of quaternary carbon atoms from an anionic surfactant used in a hydrocarbon recovery composition. In an embodiment, an aliphatic anionic sufacitant and an aliphatic nonionic additive may both have an average carbon number from 16 to 17. Both the aliphatic anionic surfactant and aliphatic nonionic additive may have branched aliphatic groups, in some embodiments. In other embodiments, an aliphatic anionic surfactant with an average carbon number of 16 to 17 may be combined with an aliphatic nonionic additive having an average carbon number from 10 to 24. The aliphatic nonionic additive and the aliphatic anionic surfactant may both have a branched aliphatic group, in certain embodiments. A branched aliphatic nonionic additive may, in other embodiments, include branches that are primarily ethyl and methyl groups. In certain embodiments, branches on the branched aliphatic anionic surfactant may be methyl groups.

In an embodiment, a composition may include an aliphatic anionic surfactant in combination with one or more sugar based surfactants. Sugar based surfactants include surfactants composed of a long chain aliphatic ester. In one embodiment, a sugar based surfactant is composed of a long chain aliphatic portion coupled to the carbonyl group of the ester and a sugar coupled to the oxygen portion of the ester. Sugar based surfactants include, but are not limited to, sorbitan monolaurate, sorbitan monplamitate, sorbitan monostearate, sorbitan monooleate, sorbitan sesquioleate, sorbitan trioleate, polyoxyethylene (20) sorbitan monolaurate, polyoxyethylene (20) sorbitan monopalmitate, polyoxyethylene (20) sorbitan monostearate, polyoxyethylene (20) sorbitan monooleate, polyoxyethylene (20) sorbitan trioleate or combinations thereof. Other sugar based surfactants include sugar based ethers and sugar based ethoxylated ethers. The compositions may be prepared by combining the aliphatic anionic surfactant with one or more sugar based surfactants at a temperature of less than about 50° C.

In some embodiments, an amount of an aliphatic anionic surfactant in a composition may be greater than about 40 wt. % of the total composition. The composition may include an aliphatic anionic surfactant in an amount from about 50 wt. % to about 90 wt. % of the total composition. An amount of an aliphatic. anionic surfactant in a composition may range from about 80 wt. % to about 90 wt. % of the total weight of the composition. An amount of a sugar based surfactant in a composition may be less than about 60 wt. % of the total weight of the composition. The composition may include an amount of a sugar based surfactant from about 10 wt. % to about 50 wt. % of the total weight of the composition. In some embodiments, an amount of a sugar based surfactant may range from about 10 wt. % to about 20 wt. % of the total weight of the composition. The remainder of the composition may include, but is not limited to, water, low molecular weight alcohols, organic solvents, alkyl sulfonates, aryl sulfonates, brine or combinations thereof. Low molecular weight alcohols include, but are not limited to, methanol, ethanol, propanol, isopropyl alcohol, tert-butyl alcohol, sec-butyl alcohol, butyl alcohol, tert-amyl alcohol or combinations thereof. Organic solvents include, but are not limited to, methyl ethyl ketone, acetone, lower alkyl cellosolves, lower alkyl carbitols or combinations thereof.

In an embodiment, a composition may include an aliphatic nonionic additive, an aliphatic anionic surfactant and one or more sugar based surfactants. In certain embodiments, a portion of the aliphatic group of the aliphatic nonionic additive may be branched. In other embodiments, a portion of the aliphatic anionic surfactant may be branched. The compositions may be prepared by combining the aliphatic nonionic additive and the aliphatic anionic surfactant with one or more sugar based surfactants at a temperature of less than about 50° C.

In some embodiments, an aliphatic nonionic additive may be greater than 50 wt. % of the total composition. The composition may include an aliphatic nonionic additive in an amount from about 45 wt. % to about 55 wt. % of the total composition. In some embodiments, an amount of an aliphatic anionic surfactant in a composition may be greater than about 35 wt. % of the total composition. The composition may also include an aliphatic anionic surfactant in an amount from about 30 wt. % to about 50 wt. % of the total composition. An amount of a sugar based surfactant in a composition may be less than about 10 wt. % of the total weight of the composition. The composition may include an amount of a sugar based surfactant less than about 10 wt. % of the total weight of the composition. In some embodiments, an amount of a sugar based surfactant may range from about 5 wt. % to about 8 wt. % of the total weight of the composition. The remainder of the composition may include, but is not limited to, water, low molecular weight alcohols, organic solvents, alkyl sulfonates, aryl sulfonates, brine or combinations thereof. Low molecular weight alcohols include, but are not limited to, methanol, ethanol, propanol, isopropyl alcohol, tert-butyl alcohol, sec-butyl alcohol, butyl alcohol, tert-amyl alcohol or combinations thereof. Organic solvents include, but are not limited to, methyl ethyl ketone, acetone, lower alkyl cellosolves, lower alkyl carbitols or combinations thereof.

A hydrocarbon recovery composition may interact with hydrocarbons in at least a portion of the hydrocarbon containing formation. Interaction with the hydrocarbons may reduce an interfacial tension of the hydrocarbons with one or more fluids in the hydrocarbon containing formation. In other embodiments, a hydrocarbon recovery composition may reduce the interfacial tension between the hydrocarbons and an overburden/underburden of a hydrocarbon containing formation. Reduction of the interfacial tension may allow at least a portion of the hydrocarbons to mobilize through the hydrocarbon containing formation.

The ability of a hydrocarbon recovery composition to reduce the interfacial tension of a mixture of hydrocarbons and fluids may be evaluated using known techniques. In an embodiment, an interfacial tension value for a mixture of hydrocarbons and water may be determined using a spinning drop tensiometer. An amount of the hydrocarbon recovery composition may be added to the hydrocarbon/water mixture and an interfacial tension value for the resulting fluid may be determined. A low interfacial tension value (e.g., less than about 1 dyne/cm) may indicate that the composition reduced at least a portion of the surface energy between the hydrocarbons and water. Reduction of surface energy may indicate that at least a portion of the hydrocarbon/water mixture may mobilize through at least a portion of a hydrocarbon containing formation.

In an embodiment, a hydrocarbon recovery composition may be added to a hydrocarbon/water mixture and the interfacial tension value may be determined. An ultralow interfacial tension value (e.g., less than about 0.1 dyne/cm) may indicate that the hydrocarbon recovery composition lowered at least a portion of the surface tension between the hydrocarbons and water such that at least a portion of the hydrocarbons may mobilize through at least a portion of the hydrocarbon containing formation. At least a portion of the hydrocarbons may mobilize more easily through at least a portion of the hydrocarbon containing formation at an ultra low interfacial tension than hydrocarbons that have been treated with a composition that results in an interfacial tension value greater than 0.1 dynes/cm for the fluids in the formation. Addition of a hydrocarbon recovery composition to fluids in a hydrocarbon containing formation that results in an ultra-low interfacial tension value may increase the efficiency at which hydrocarbons may be produced. A hydrocarbon recovery composition concentration in the hydrocarbon containing formation may be minimized to minimize cost of use during production.

In an embodiment of a method to treat a hydrocarbon containing formation, a hyurocarbon recovery composition including a nonionic additive (e.g., a long chain aliphatic alcohol) and an anionic surfactant (e.g., a long chain aliphatic acid salt) may be provided (e.g., injected) into hydrocarbon containing formation 100 through injection well 110 as depicted in FIG. 1. Hydrocarbon formation 100 may include overburden 120, hydrocarbon layer 130, and underburden 140. Injection well 110 may include openings 112 that allow fluids to flow through hydrocarbon containing formation 100 at various depth levels. In certain embodiments, hydrocarbon layer 130 may be less than 1000 feet below earth's surface. In some embodiments, underburden 140 of hydrocarbon containing formation 100 may be oil wet. Low salinity water may be present in hydrocarbon containing formation 100, in other embodiments.

A hydrocarbon recovery composition may be provided to the formation in an amount based on hydrocarbons present in a hydrocarbon containing formation. The amount of hydrocarbon recovery composition, however, may be too small to be accurately delivered to the hydrocarbon containing formation using known delivery techniques (e.g., pumps). To facilitate delivery of small amounts of the hydrocarbon recovery composition to the hydrocarbon containing formation, the hydrocarbon recovery composition may be combined with water and/or brine to produce an injectable fluid. An amount of a hydrocarbon recovery composition injected into hydrocarbon containing formation 100 may be less than 0.5 wt. % of the total weight of the injectable fluid. In certain embodiments, an amount of a hydrocarbon recovery composition provided to a hydrocarbon containing formation may be less than 0.3 wt. % of the total weight of injectable fluid. In some embodiments, an amount of a hydrocarbon recovery composition provided to a hydrocarbon containing formation may be less than 0.1 wt. % of the total weight of injectable fluid. In other embodiments, an amount of a hydrocarbon recovery composition provided to a hydrocarbon containing formation may be less than 0.05 wt. % of the total weight of injectable fluid.

The hydrocarbon recovery composition may interact with at least a portion of the hydrocarbons in hydrocarbon layer 130. The interaction of the hydrocarbon recovery composition with hydrocarbon layer 130 may reduce at least a portion of the interfacial tension between different hydrocarbons. The hydrocarbon recovery composition may also reduce at least a portion of the interfacial tension between one or more fluids (e.g., water, hydrocarbons) in the formation and the underburden 140, one or more fluids in the formation and the overburden 120 or combinations thereof. In an embodiment, a hydrocarbon recovery composition may interact with at least a portion of hydrocarbons and at least a portion of one or more other fluids in the formation to reduce at least a portion of the interfacial tension between the hydrocarbons and one or more fluids. Reduction of the interfacial tension may allow at least a portion of the hydrocarbons to form an emulsion with at least a portion of one or more fluids in the formation. An interfacial tension value between the hydrocarbons and one or more fluids may be altered by the hydrocarbon recovery composition to a value of less than about 0.1 dyne/cm. In some embodiments, an interfacial tension value between the hydrocarbons and other fluids in a formation may be reduced by the hydrocarbon recovery composition to be less than about 0.05 dyne/cm. An interfacial tension value between hydrocarbons and other fluids in a formation may be lowered by the hydrocarbon recovery composition to less than 0.001 dyne/cm, in other embodiments. At least a portion of the hydrocarbon recovery composition/hydrocarbon/fluids mixture may be mobilized to production well 150. Products obtained from the production well 150 may include, but are not limited to, components of the hydrocarbon recovery composition (e.g., a long chain aliphatic alcohol and/or a long chain aliphatic acid salt), methane, carbon monoxide, water, hydrocarbons, ammonia, asphaltenes, or combinations thereof. Hydrocarbon production from hydrocarbon containing formation 100 may be increased by greater than about 50% after the hydrocarbon recovery composition has been added to a hydrocarbon containing formation.

In certain embodiments, hydrocarbon containing formation 100 may be pretreated with a hydrocarbon removal fluid. A hydrocarbon removal fluid may be composed of water, steam, brine, gas, liquid polymers, foam polymers, monomers or mixtures thereof. A hydrocarbon removal fluid may be used to treat a formation before a hydrocarbon recovery composition is provided to the formation. Hydrocarbon containing formation 100 may be less than 1000 feet below the earth's surface, in some embodiments. A hydrocarbon removal fluid may be heated before injection into a hydrocarbon containing formation 100, in certain embodiments. A hydrocarbon removal fluid may reduce a viscosity of at least a portion of the hydrocarbons within the formation. Reduction of the viscosity of at least a portion of the hydrocarbons in the formation may enhance mobilization of at least a portion of the hydrocarbons to production well 150. After at least a portion of the hydrocarbons in hydrocarbon containing formation 100 have been mobilized, repeated injection of the same or different hydrocarbon removal fluids may become less effective in mobilizing hydrocarbons through the hydrocarbon containing formation. Low efficiency of mobilization may be due to hydrocarbon removal fluids creating more permeable zones in hydrocarbon containing formation 100. Hydrocarbon removal fluids may pass through the permeable zones in the hydrocarbon containing formation 100 and not interact with and mobilize the remaining hydrocarbons. Consequently, displacement of heavier hydrocarbons adsorbed to underburden 140 may be reduced over time. Eventually, the formation may be considered low producing or economically undesirable to produce hydrocarbons.

In certain embodiments, injection of a hydrocarbon recovery composition after treating the hydrocarbon containing formation with a hydrocarbon removal fluid may enhance mobilization of heavier hydrocarbons absorbed to underburden 140. The hydrocarbon recovery composition may interact with the hydrocarbons to reduce an interfacial tension between the hydrocarbons and underburden 140. Reduction of the interfacial tension may be such that hydrocarbons are mobilized to and produced from production well 150. Produced hydrocarbons from production well 140 may include, in some embodiments, at least a portion of the components of the hydrocarbon recovery composition, the hydrocarbon removal fluid injected into the well for pretreatment, methane, carbon dioxide, ammonia, or combinations thereof. Adding the hydrocarbon recovery composition to at least a portion of a low producing hydrocarbon containing formation may extend the production life of the hydrocarbon containing formation. Hydrocarbon production from hydrocarbon containing formation 100 may be increased by greater than about 50% after the hydrocarbon recovery composition has been added to hydrocarbon containing formation. Increased hydrocarbon production may increase the economic viability of the hydrocarbon containing formation.

In some embodiments, a hydrocarbon recovery composition may be added to a portion of hydrocarbon containing formation 100 that may have an average temperature of less than 50° C. To facilitate delivery of an amount of the hydrocarbon recovery composition to the hydrocarbon containing formation, the hydrocarbon composition may be combined with water or brine to produce an injectable fluid. Less than about 0.5 wt % of the hydrocarbon recovery composition, based on the total weight of injectable fluid, may be injected into hydrocarbon containing formation 100 through injection well 110. In certain embodiments, the concentration of the hydrocarbon recovery composition injected through injection well 110 may be less than 0.3 wt. %, based on the total weight of injectable fluid. In some embodiments, the concentration of the hydrocarbon recovery composition may be less 0.1 wt. % based on the total weight of injectable fluid. In other embodiments, the concentration of the hydrocarbon recovery composition may be less 0.05 wt. % based on the total weight of injectable fluid.

Interaction of the hydrocarbon recovery composition with at least a portion of hydrocarbons in the formation may reduce at least a portion of an interfacial tension between the hydrocarbons and underburden 140. Reduction of at least a portion of the interfacial tension may mobilize at least a portion of hydrocarbons through hydrocarbon containing formation 100. Mobilization of at least a portion of hydrocarbons, however, may not be at an economically viable rate. In one embodiment, polymers may be injected into hydrocarbon formation 100 through injection well 110, after treatment of the formation with a hydrocarbon recovery composition, to increase mobilization of at least a portion of the hydrocarbons through the formation. Suitable polymers include, but are not limited to, CIBA® ALCOFLOOD®, manufactured by Ciba Specialty Additives (Tarrytown, N.Y.), Tramfloc® manufactured by Tramfloc Inc. (Temple, Ariz.), and HE® polymers manufactured by Chevron Phillips Chemical Co. (The Woodlands, Tex.). Interaction between the hydrocarbons, the hydrocarbon recovery composition and the polymer may increase mobilization of at least a portion of the hydrocarbons remaining in the formation to production well 150.

Figure 2:
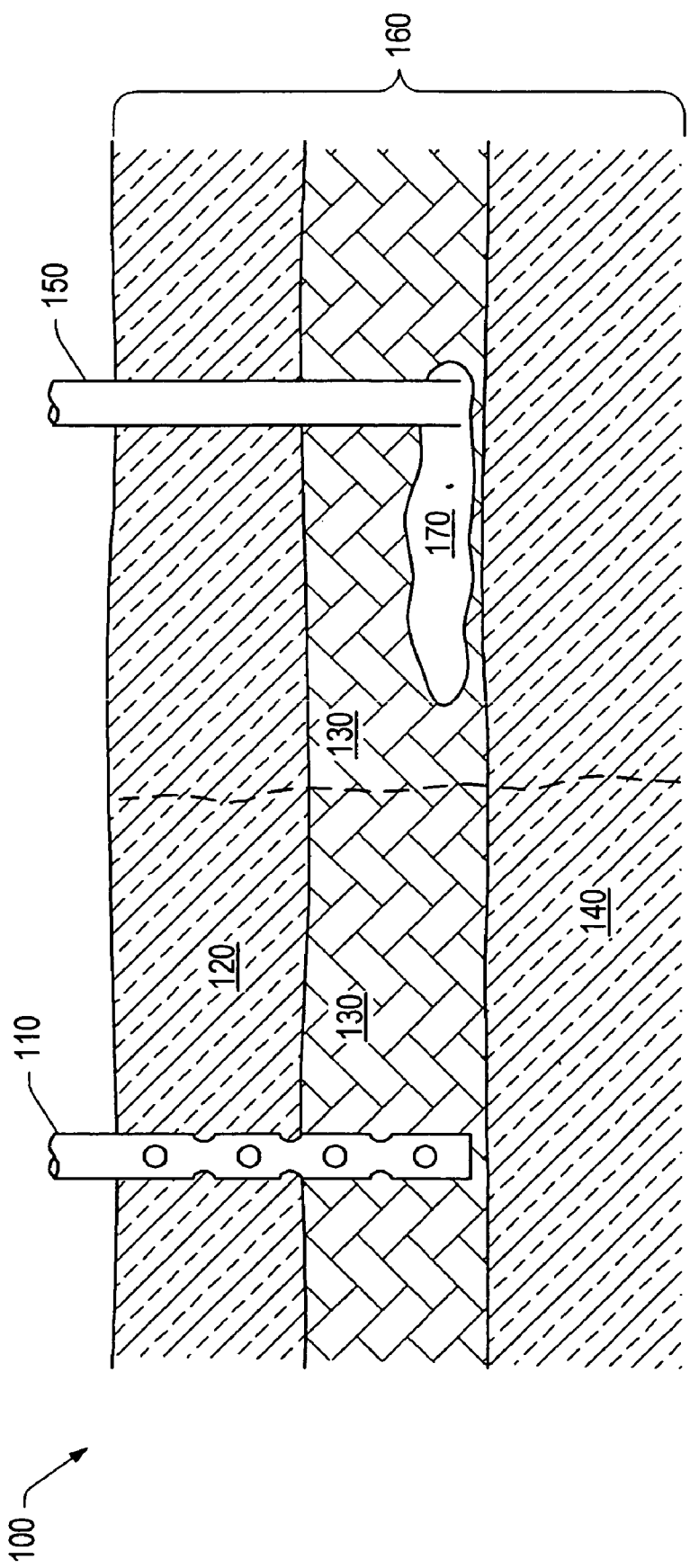
FIG. 2 depicts an embodiment of treating a hydrocarbon containing formation.

In some embodiments, a hydrocarbon recovery composition may be added to a portion of a hydrocarbon containing formation 100 that has an average temperature of less than 50° C. In some embodiments, a hydrocarbon recovery composition may be combined with at least a portion of a hydrocarbon removal fluid (e.g. water, polymer solutions) to produce an injectable fluid. Less than about 0.5 wt % of the hydrocarbon recovery composition, based on the total weight of injectable fluid, may be injected into hydrocarbon containing formation 100 through injection well 110 as depicted in FIG. 2. In certain embodiments, a concentration of the hydrocarbon recovery composition injected through injection well 110 may be less than 0.3 wt. %, based on the total weight of injectable fluid. In some embodiments, less than 0.1 wt. % of the hydrocarbon recovery composition, based on the total weight of injectable fluid, may be injected through injection well 110 into hydrocarbon containing formation 100. In other embodiments, less than 0.05 wt. % of the hydrocarbon recovery composition, based on the total weight of injectable fluid, may be injected through injection well 110 into hydrocarbon containing formation 100. Interaction of the hydrocarbon recovery composition with hydrocarbons in the formation may reduce at least a portion of an interfacial tension between the hydrocarbons and underburden 140. Reduction of at least a portion of the interfacial tension may mobilize at least a portion of hydrocarbons to a selected section 160 in hydrocarbon containing formation 100 to form hydrocarbon pool 170. At least a portion of the hydrocarbons may be produced from hydrocarbon pool 170 in the selected section of hydrocarbon containing formation 100.

In other embodiments, mobilization of at least a portion of hydrocarbons to selected section 160 may not be at an economically viable rate. Polymers may be injected into hydrocarbon formation 100 to increase mobilization of at least a portion of the hydrocarbons through the formation. Interaction between at least a portion of the hydrocarbons, the hydrocarbon recovery composition and the polymers may increase mobilization of at least a portion of the hydrocarbons to production well 150.

In some embodiments, a hydrocarbon recovery composition may include an inorganic salt (e.g. sodium carbonate ($Na_2CO_3$), sodium chloride (NaCl), or calcium chloride ($CaCl_2$)). The addition of the inorganic salt may help the hydrocarbon recovery composition disperse throughout a hydrocarbon/water mixture. The enhanced dispersion of the hydrocarbon recovery composition may decrease the interactions between the hydrocarbon and water interface. The decreased interaction may lower the interfacial tension of the mixture and provide a fluid that is more mobile.

In another embodiment, a hydrocarbon recovery composition may include polymers and/or monomers. As described above, polymers may be used to increase mobilization of at least a portion of the hydrocarbons through the formation. Suitable polymers have been described previously. Interaction between the hydrocarbons and the polymer containing hydrocarbon recovery composition may increase mobilization of at least a portion of the hydrocarbons remaining in the formation.

EXAMPLES

Hydrocarbon recovery compositions including anionic surfactants, nonionic additives, sugar based surfactants and/or combinations thereof were prepared and interfacial tension measurements were compared for a variety of different compositions. Compositions and interfacial tension measurements are tabulated in Table 1.

Interfacial tension values for the hydrocarbon/hydrocarbon recovery composition/water mixtures were determined using a spinning drop tensiometer. A one to four microliter (µL) drop of Nowata crude hydrocarbons were placed into a capillary tube that contained a hydrocarbon recovery composition/brine solution. The tube was placed into a spinning drop apparatus and then capped. The motor was turned on rapidly to rotate the tube to create a cylindrical drop within the tube (e.g. 6 to 12 ms/rev). The drop length may be greater than or equal to 4 times the width of a drop. The capillary tube and drop were heated to a hydrocarbon containing formation temperature (about 30° C.). The drop was video taped for later replay for measurement of the interfacial tension between the drop and the composition/brine using an Optima® System. The time range of the measurements was from about 0.01 to about 0.4 hours. Density of the Nowata hydrocarbons was about 0.8294. Density of the aqueous phase, gm/cc was 0.9960. Refractive Index of the aqueous phase was about 1.3325. The water to oil ratio was about 250:1. Experiments No. 6-125 include Nowata Brine and Nowata Crude in about a 250:1 ratio.

TABLE 1

| Exp. No. | Composition (wt. %) | Sample Amount (µliter) | Sample Composition | Salt Added | IFT Lo Range (dynes/cm) | IFT Hi Range (dynes/cm) | Temp. ° C. |
|---|---|---|---|---|---|---|---|
| 1 | — | 5 | Nowata Crude + Nowata Brine | — | 10.3 | 10.8 | 30 |
| 2 | Air | — | Nowata Brine + Air Drop | — | 20.0 | 21.0 | 30 |
| 3 | Air | — | Distilled Water + Air Drop | — | 51.6 | 54.5 | 30 |
| 4 | 0.5 | 4 | $C_{13}$-$C_{14}$ IOS | | 0.6040 | 1.1400 | 30 |
| 5 | 0.5 | 4 | Noedene ® 12-1 PDOS | | 0.8720 | 1.1200 | 30 |
| 6 | 0.5 | 4 | Dodecyl-1 1.5 POS | | 0.5290 | 0.7740 | 30 |
| 7 | 0.5 | 4 | $C_{13}$-$C_{14}$ IOS | 6% NaCl | 0.8760 | 1.2300 | 30 |
| 8 | 0.5 | 4 | N67S | 6% $Na_2CO_3$ | — | — | 30 |
| 9 | 0.5 | 4 | Dodecyl-1 1.5 POS | 6% $Na_2CO_3$ | 0.3870 | 0.4600 | 30 |
| 10 | 0.5 | 4 | AOS | 6% $Na_2CO_3$ | 0.8820 | 1.3200 | 30 |
| 11 | 0.5 | 4 | $C_{14}$-$C_{15}$ 1 POS | | 0.1200 | 0.3360 | 30 |
| 12 | 0.5 | 4 | $C_{14}$-$C_{15}$ 1 POS | 1% $Na_2CO_3$ | 0.1770 | 0.4510 | 30 |
| 13 | 0.5 | 4 | $C_{14}$-$C_{15}$ 1 POS | 2% $Na_2CO_3$ | 0.0910 | 0.4530 | 30 |
| 14 | 0.5 | 4 | Noedene ® 14 1 PDO 7EO | 6% $Na_2CO_3$ | 0.2500 | 0.2500 | 30 |
| 15 | 0.5 | 4 | Noedene ® 14 1 PDO 7EO | | 0.1220 | 0.5000 | 30 |
| 16 | 0.5 | 4 | Noedene ® 14 1 PDO 7EO | 3% $Na_2CO_3$ | 0.1530 | 0.1200 | 30 |
| 17 | 0.5 | 4 | Noedene ® 14 1 PDO 7EO | 6% $Na_2CO_3$ | 0.2300 | 0.2560 | 30 |
| 18 | 0.5 | 4 | Noedene ® 14 1 PDO 7EO | | 0.1790 | 0.5370 | 30 |
| 19 | 0.5 | 4 | Noedene ® 14 1 PDO 7EO | | 0.1890 | 0.2720 | 30 |
| 20 | 0.5 | 4 | N45-7 | | 0.2010 | 0.2720 | 30 |
| 21 | 0.5 | 4 | N45-7 | 1% $Na_2CO_3$ | 0.2010 | 0.3770 | 30 |
| 22 | 0.5 | 4 | N45-7 | 3% $Na_2CO_3$ | 0.1190 | 0.1630 | 30 |

TABLE 1-continued

| Exp. No. | Composition (wt. %) | Sample Amount (µliter) | Sample Composition | Salt Added | IFT Lo Range (dynes/cm) | IFT Hi Range (dynes/cm) | Temp. ° C. |
|---|---|---|---|---|---|---|---|
| 23 | 0.5 | 4 | N45-2.25S | 3% Na$_2$CO$_3$ | 0.1640 | 0.3190 | 30 |
| 24 | 0.5 | 4 | 50/50 Ethoquad ®/N45-2.25S | | 0.4710 | 0.6580 | 30 |
| 25 | 0.5 | 4 | Zonyl ® "FSN" | | 3.4910 | 4.3800 | 30 |
| 26 | 0.5 | 4 | FC-171 | | 6.300 | 8.900 | 30 |
| 27 | 0.5 | 4 | 50/50 Ethoquad ®/C$_{14}$-C$_{15}$ 1 POS | | 0.2780 | 0.4100 | 30 |
| 28 | 0.5 | 4 | 50/50 C$_{14}$-C$_{15}$ 1 POS/Span ® 20 | | 0.0700 | 0.04200 | 30 |
| 29 | 0.5 | 4 | 50/50 N45-2.25S/Span ® 20 | | 0.0190 | 0.0470 | 30 |
| 30 | 0.5 | 4 | 60/40/Trace N45-2.25S/Ethoquad ®/Arquad ® | | 0.0745 | 0.1040 | 30 |
| 31 | 0.5 | 4 | 60/40/Trace C$_{14}$-C$_{15}$ 1 POS/Ethoquad ®/Arquad ® | | 0.3740 | 0.7010 | 30 |
| 32 | 0.1 | 3 | C$_{16}$ 1.8 PO | | 0.0890 | 0.1450 | 30 |
| 33 | 0.1 | 3 | C$_{16}$ 1.8 PO | 1% Na$_2$CO$_3$ | 0.540 | 0.1590 | 30 |
| 34 | 0.5 | 4 | 80/20 N45-2.25S/N45-2.25 | | 0.2010 | 0.2340 | 30 |
| 35 | 0.5 | 4 | 70/30 N45-2.25S/N45-2.25 | | 0.1290 | 0.1380 | 30 |
| 36 | 0.5 | 4 | 60/40 N45-2.25S/N45-2.25 | | 0.1260 | 0.1380 | 30 |
| 37 | 0.5 | 4 | 50/50 N45-2.25S/N45-2.25 | | 0.1830 | 0.2140 | 30 |
| 38 | 0.5 | 4 | 63/37 N45-2.25S/N45-2.25 | 3% Na$_2$CO$_3$ | 0.0790 | 0.280 | 30 |
| 39 | 0.5 | 4 | N45-2.25S | 3% Na$_2$CO$_3$ | 0.1250 | 0.3430 | 30 |
| 40 | 0.5 | 4 | 50/50 N45-2.25S/N25-3 | 3% Na$_2$CO$_3$ | — | — | 30 |
| 41 | 0.5 | 2.5 | 59/51 N25-2.25S/N1-5 | 3% Na$_2$CO$_3$ | — | — | 30 |
| 42 | 0.5 | 4 | 48/52 N45-2.25S/Span ® 20 | | 0.0910 | 0.1330 | 30 |
| 43 | 0.5 | 4 | 60/40 N45-2.25S/Span ® 20 | | 0.1090 | 0.1860 | 30 |
| 44 | 0.1 | 3 | 60/40 N45-2.25S/Span ® 20 | 3% Na$_2$CO$_3$ | 0.1030 | 0.2190 | 30 |
| 45 | 0.1 | 3 | 60/30/9/1 N45-2.25S/Span ® 20/Ethoquad ®/Arquad | | 0.1550 | 0.280 | 30 |
| 46 | 0.1 | 3 | 60/30/5/5 N45-2.25S/Span ® 20/Ethoquad/Arquad ® | | 0.1270 | 0.1860 | 30 |
| 47 | 0.1 | 3 | 60/30/10/0 N45-2.25S/Span ® 20/Ethoquad ®/Arquad ® | | 0.1040 | 0.1690 | 30 |
| 48 | 0.1 | 3 | 60/30/0/10 N45-2.25S/Span ® 20/Ethoquad ®/Arquad ® | | 0.1760 | 0.4010 | 30 |
| 49 | 0.1 | 3 | 60/30/20 N45-2.25S/Span ® 20/Ethoquad ® | | 0.2110 | 0.3830 | 30 |
| 50 | 0.1 | 3 | 60/30/20 N45-2.25S/Span ® 20/Ethoquad ® | | 0.2500 | 0.4580 | 30 |
| 51 | 0.1 | 3 | N67S | 1% Na$_2$CO$_3$ | 0.0200 | 0.1210 | 30 |
| 52 | 0.1 | 3 | N67S | 3% Na$_2$CO$_3$ | 0.0022 | 0.310 | 30 |
| 53 | 0.1 | 3 | 53/47 N67S/Span ® 20 | | 0.0081 | 0.750 | 30 |
| 54 | 0.1 | 3 | 50/50 N45-2.25S/Span ® 20 | | 0.2170 | 0.3030 | 30 |
| 55 | 0.1 | 3 | 53/47 N67S/Span ® 20 | | 0.1800 | 0.7620 | 30 |
| 56 | 0.5 | 3 | 53/47 N67S/Span ® 20 | | 0.3320 | 1.1380 | 30 |
| 57 | 0.5 | 3 | 53/47 N67S/Span ® 20 | 1% Na$_2$CO$_3$ | 0.0199 | 0.0374 | 30 |
| 58 | 0.1 | 3 | 53/47 N67S/Span ® 20 | 1% Na$_2$CO$_3$ | 0.0099 | 0.0430 | 30 |
| 59 | 0.1 | 3 | 62.5/37.5 N45-2.25S/Span ® 20 | | 0.8320 | 1.0250 | 30 |
| 60 | 0.1 | 3 | 62.5/37.5 N45-2.25S/Span ® 20 | 1% Na$_2$CO$_3$ | 0.0638 | 0.1150 | 30 |
| 61 | 0.1 | 3 | 62.5/37.5 N45-2.25S/Span ® 20 | 3% Na$_2$CO$_3$ | 0.0386 | 0.0720 | 30 |
| 62 | 0.1 | 1 | 45/55 N67S/N67 | | 0.0020 | 0.0283 | 30 |
| 63 | 0.1 | 1.5 | 45/55 N67S/N67 | 1% Na$_2$CO$_3$ | 0.0245 | 0.0566 | 30 |
| 64 | 0.1 | 2 | 45/55 N67S/N67 | | 0.0096 | 0.0428 | 30 |
| 65 | 0.1 | 3 | 50/50 N67S/N67 | | 0.0061 | 0.0324 | 30 |
| 66 | 0.1 | 2 | 50/50 N67S/N67 | 1% Na$_2$CO$_3$ | 0.0101 | 0.0959 | 30 |
| 67 | 0.1 | 3 | 55/45 N67S/N67 | | 0.0142 | 0.0312 | 30 |
| 68 | 0.1 | 2 | 55/45 N67S/N67 | 1% Na$_2$CO$_3$ | 0.0228 | 0.0784 | 30 |
| 69 | 0.1 | 2 | 60/40 N67S/N67 | | 0.0064 | 0.0279 | 30 |
| 70 | 0.1 | 2 | 60/40 N67S/N67 | 1% Na$_2$CO$_3$ | 0.0194 | 0.0505 | 30 |
| 71 | 0.1 | 2 | 70/30 N67S/N67 | | 0.0699 | 0.0778 | 30 |
| 72 | 0.1 | 2 | 74.5/25.4 N67S/N67 | | 0.0289 | 0.0440 | 30 |
| 73 | 0.1 | 2 | 74.5/25.4 N67S/N67 | 1% Na$_2$CO$_3$ | 0.0227 | 0.0652 | 30 |

TABLE 1-continued

| Exp. No. | Composition (wt. %) | Sample Amount (μliter) | Sample Composition | Salt Added | IFT Lo Range (dynes/cm) | IFT Hi Range (dynes/cm) | Temp. °C. |
|---|---|---|---|---|---|---|---|
| 74 | 0.05 | 2 | 82/18 N67S/N67 | | 0.1580 | 0.5180 | 30 |
| 75 | 0.1 | 2 | 82/18 N67S/N67 | | 0.0120 | 0.1940 | 30 |
| 76 | 0.1 | 2 | 82/18 N67S/N67 | | 0.0188 | 0.0845 | 30 |
| 77 | 0.1 | 2 | 82/18 N67S/N67 | 1% $Na_2CO_3$ | 0.0151 | 0.0646 | 30 |
| 78 | 0.2 | 2 | 82/18 N67S/N67 | | 0.3500 | 0.4420 | 30 |
| 79 | 0.5 | 2 | 82/18 N67S/N67 | | 0.3780 | 0.4390 | 30 |
| 80 | 0.1 | 2 | 94.1/5.9 N67S/N67 | | 0.1230 | 0.1760 | 30 |
| 81 | 0.1 | 2 | 82/18 N67S/N67 in Distilled Water | 700 ppm $CaCl_2$ | 1.2125 | 1.3780 | 30 |
| 82 | 0.1 | 2 | 82/18 N67S/N67 in Distilled Water | 700 ppm $CaCl_2$ | 0.6320 | 1.4150 | 30 |
| 83 | 0.1 | 2 | 82/18N67S/N67 | 2400 ppm $CaCl_2$ | 0.1660 | 0.2251 | 30 |
| 84 | 0.05 | 1 | 82/18 N67S/N67 | | 0.0960 | 0.6800 | 30 |
| 85 | 0.1 | 1 | 82/18 N67S/N67 | | 0.0106 | 0.1938 | 30 |
| 86 | 0.1 | 1 | 82/18 N67S/N67 in Isopropyl alcohol | | 0.0069 | 0.1640 | 30 |
| 87 | 0.1 | 1 | 82/18 N67S/N67 in Distilled Water | | 2.2800 | 2.2700 | 30 |
| 88 | 0.1 | 2 | 40/40/20 N67S/N67/Span ® 20 | | 0.3580 | 0.3950 | 30 |
| 89 | 0.1 | 2 | 40/40/20 N67S/N67/Span ® 20 | 1% $Na_2CO_3$ | 0.0357 | 0.1951 | 30 |
| 90 | 0.1 | 2 | 40/50/10 N67S/N67/Span ® 20 | | 0.3110 | 0.4140 | 30 |
| 91 | 0.1 | 2 | 40/50/10 N67S/N67/Span ® 20 | 1% $Na_2CO_3$ | 00335 | 0.2970 | 30 |
| 92 | 0.1 | 2 | 40/55/5 N67S/N67/Span ® 20 | | 0.0638 | 0.2119 | 30 |
| 93 | 0.1 | 2 | 40/55/5 N67S/N67/Span ® 20 | 1% $Na_2CO_3$ | 0.0909 | 0.2850 | 30 |
| 94 | 0.1 | 2 | 40/55/5 N67S/N67/Span ® 20 | 0.3% $Na_2CO_3$ | 2.0980 | 1.9040 | 30 |
| 95 | 0.1 | 2 | 75/12.5/12.7 N67S/N67/Span ® 20 | | 0.0200 | 0.0391 | 30 |
| 96 | 0.1 | 2 | 75/12.5/12.7 N67S/N67/Span ® 20 | 1% $Na_2CO_3$ | 0.0537 | 0.947 | 30 |
| 97 | 0.1 | 2 | 75/12.5/12.7 N67S/N67/Span ® 20 | 300 ppm $CaCl_2$ | 0.1883 | 0.1996 | 30 |
| 115 | 0.1 | 1 | 34/57/8 N67S/N67/Span ® 80 | | 0.2500 | 0.4730 | 30 |
| 116 | 0.1 | 1 | 34/57/8 N67S/N67/Span ® 80 | 1% $Na_2CO_3$ | 0.0445 | 0.7248 | 30 |
| 98 | 0.1 | 1 | 38/52/9.6 N67S/N67/Span ® 80 | | 0.0178 | 0.1780 | 30 |
| 99 | 0.1 | 1 | 38/52/9.6 N67S/N67/Span ® 80 | 1% $Na_2CO_3$ | 0.0231 | 0.0595 | 30 |
| 110 | 0.1 | 2 | 40/55/5 N67S/N67/Span ® 80 | | 0.0185 | 0.0504 | 30 |
| 111 | 0.1 | 2 | 40/55/5 N67S/N67/Span ® 80 | 1% $Na_2CO_3$ | 0.0253 | 0.1863 | 30 |
| 112 | 0.1 | 2 | 79/24 N67S/Span ® 80 | | 0.0225 | 0.0470 | 30 |
| 113 | 0.1 | 2 | 79/24 N67S/Span ® 80 | 1% $Na_2CO_3$ | 0.0724 | 0.1209 | 30 |

IOS = Internal olefin sulfonate, sodium salt;
PDOS = Olefin propandial adduct sulfate, sodium salt;
POS = Propoxysulfate, sodium salt;
AOS = Alpha olefin sulfonate, sodium salt;
Neodene 14 1 PDO 7 EO = $C_{14}$ olefin propandiol adduct, 7-EO ethoxylate. Dodecyl-1 1.5 POS;
N45-7 = Neodol ® $C_{14}$-$C_{15}$ ethoxylated (7 EO) alcohol;
N45-2.25S = Neodol ® $C_{14}$-$C_{15}$ ethoxylated (2.5 EO) sulfate, sodium salt;
Ethoquad ® = Polyoxyethylenemonoalkylmethylammonium chloride;
Zonyl ® "FSN" = Fluorinated nonionic surfactant;
FC-171 = 3M ® Fluorinated alkyl alkoxylate;
SPAN ® 20 = sorbitan monolaurate;
Arquad ® = Monoalkyltrimethylammonium chlorides;
N25-3 = Neodol ® $C_{12}$ to $C_{15}$ ethoxylated (3 EO) alcohol;
N1-5 = Neodol ® $C_{11}$ ethoxylated (5 EO) alcohol;
$C_{16}$ 1.8 PO = $C_{16}$ propoxylated (1.8 PO) alcohol sulfate, sodium salt;
N67S/N67 = Neodol ® $C_{16}$-$C_{17}$ branched sulfate/Neodol ® $C_{16}$-$C_{17}$ branched alcohol and
Span ® 80 = sorbitan monooleate.

Figure 3:
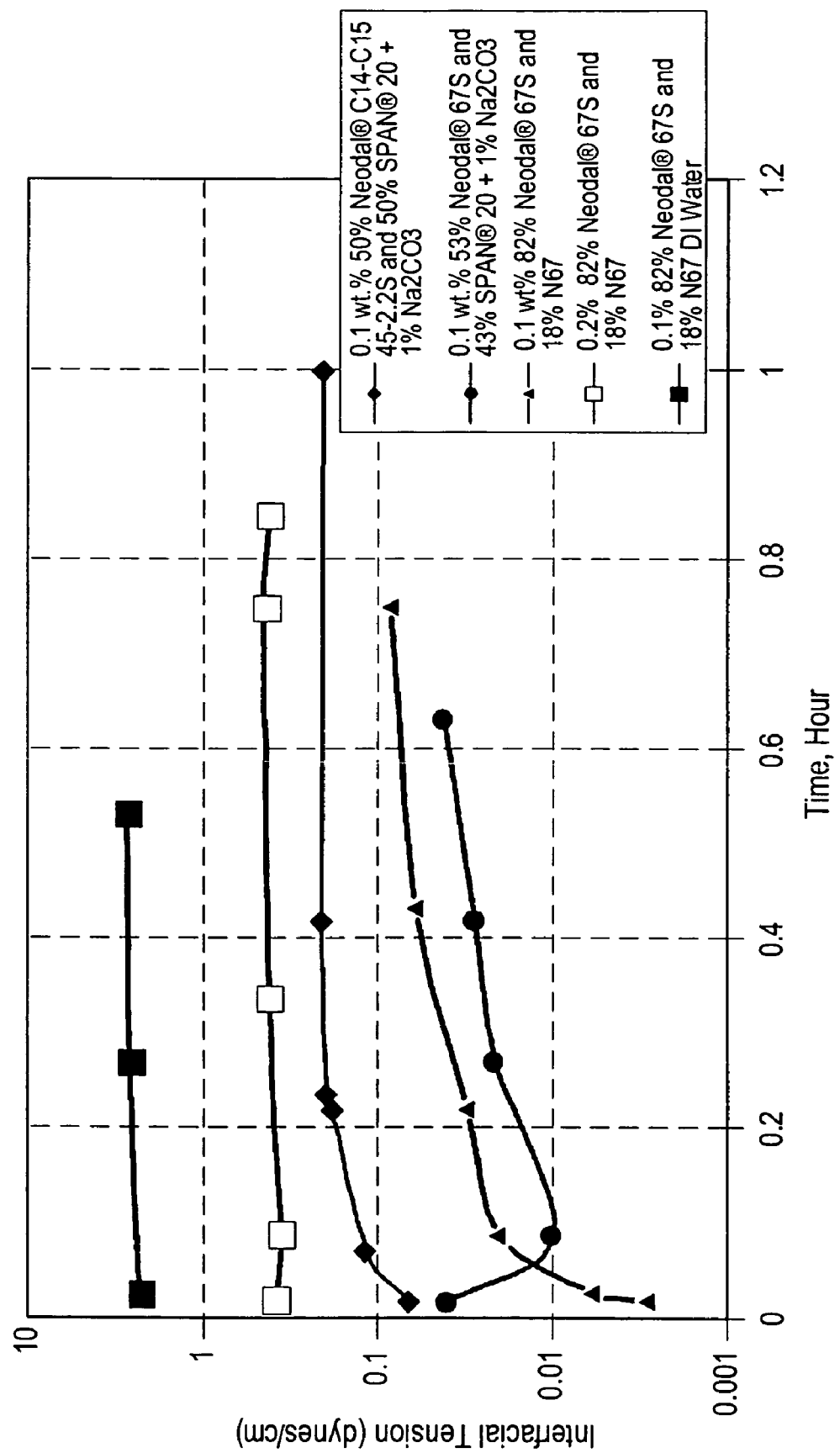
FIG. 3 depicts a graphical representation of interfacial tension values.

Interfacial tension values versus time for Nowata crude and brine with 0.1 wt % of 50% Neodol® $C_{14}$-$C_{15}$ 45-2.2S and 50% SPAN® 20 composition and 1% $Na_2CO_3$; 0.1 wt. % of a 53% Neodol® 67S and 43% SPAN® 20 composition and 1% $Na_2CO_3$; 0.1 wt % of a 82% Neodol® 67S and 18% N67 composition; 0.2 wt. % of a 82% Neodol® 67S and 18% Neodol® 67 composition and 0.1 wt. % of 82% Neodol® 67S and 18% Neodol® 67 composition with 1% $Na_2CO_3$ are depicted graphically in FIG. 3.

Figure 4:
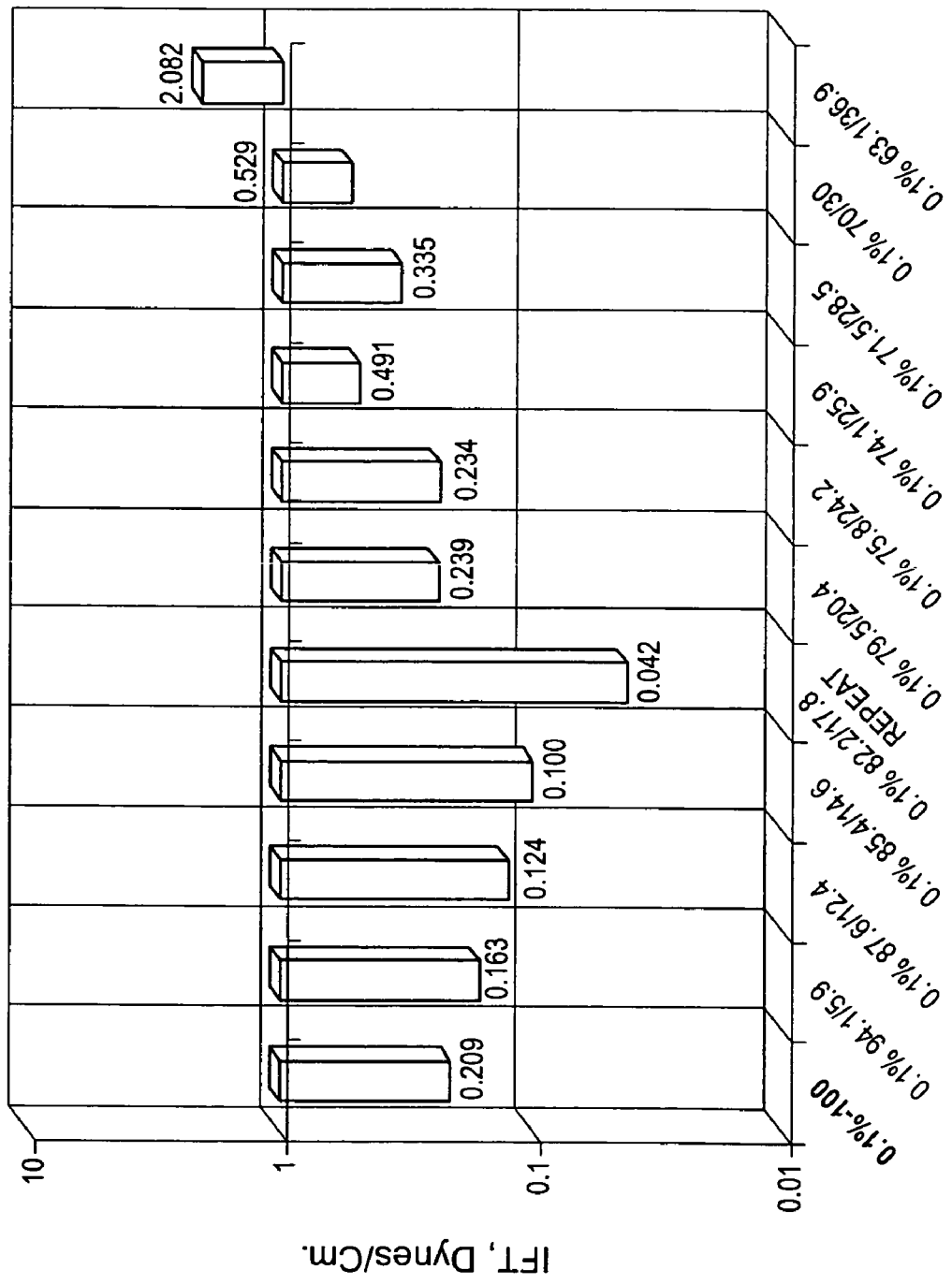
FIG. 4 depicts a graphical representation of interfacial tension values.

Interfacial tension values versus time for Nowata crude and brine and the addition of 0.1% of N67S/N67 mixtures are depicted in FIG. 4. Amounts of N67S in the mixture ranged between 100 wt. % to about 63.1 wt. %. Amounts of N67 in the mixture was less than about 36.9 wt. %. A mixture of about 82 wt % N67S and about 18 wt. % N67 reduced the interfacial tension to about 0.042 dynes/cm.

Three hydrocarbon recovery compositions exhibited low interfacial tension values were prepared and tested in a laboratory to determine the hydrocarbon recovery compositions effect on enhancing hydrocarbon recovery from a hydrocarbon containing formation. Small diameter core tests were performed according to generally known methods to determine the effectiveness of the blends on hydrocarbons recovery from a hydrocarbon containing formation that may be depleted to a residual saturation of about 20% hydrocarbons.

Example 1

Composition #1 was prepared by mixing about 50 wt. % of the sodium salt of a $C_{14}$ to $C_{15}$ branched ethoxy sulfate (e.g., Neodol® 45-2.2S Shell Chemical Co., Houston Tex.) with 50 wt. % sorbitan laurate (e.g., SPAN® 20) at a temperature of less than about 50° C.

A polymeric column (3.8 cm×27 cm) was dry packed with about 196 mL (519.8 grams) Oklahoma #1 sand, purged with nitrogen (7 psi) then evacuated with a vacuum. Nitrogen purging and subsequent vacuum evacuation was repeated twice. About 78 mL of Nowata crude in about 94.5 mL water was added to the column until the sand was completely saturated with hydrocarbons. The sand pack had a pore volume (PV) of about 90.73 mL, a porosity of about 32%, an absolute permeability to water of 1.1 darcy, a saturation of 1.07 volume % and an effective permeability to hydrocarbons of 1.5 darcy. About 103 mL of Nowata produced water (brine from Nowata Oil Field, Okla.) was delivered vertically from the bottom of the column to the top of the column to waterflood the sand pack (e.g., remove hydrocarbons from the sand). The water flow rate during waterflooding was lower than the water flow rate during the water saturation period. Waterflood flow rate was about 9.5 meter/darcy (Darcy velocity). About 64 mL of hydrocarbons was collected during the waterflood. Residual hydrocarbon saturation was determined to be between about 15 volume % and an effective permeability to water of about 0.51 darcy was obtained.

A pre-polymer solution ALCOFLOOD®, manufactured by Ciba Specialty Additives (Tarrytown, N.Y.), 0.05 PV) was delivered vertically from the bottom of the column to the top of the column at about 0.1 wt. % polymer concentration. A 0.2 PV solution (210 mL) of 0.2 wt. % of composition #1, 0.1 wt. % polymer and 0.1 wt % $Na_2CO_3$ was delivered vertically from the bottom of the column to the top of the column.

After the composition #1/polymer flood, 0.5 PV amount of polymer was delivered vertically from the bottom of the column to the top of the column to control mobility of the hydrocarbons. Flow rate of hydrocarbons through the column and volume of recovered hydrocarbons were monitored during all stages of the test. An average flow rate of 0.025 mL/sec was determined during the composition #1/polymer flood. Total volume of hydrocarbons recovered from the sand was about 19 mL. Total volume efficiency was calculated to be about 19%. A post-polishing step was performed by delivering vertically from the bottom of the column to the top of the column 1.25 PV of a brine solution.

Example 2

Composition #2 was prepared by mixing about 53 wt. % of the sodium salt of a $C_{16}$ to $C_{17}$ branched aliphatic sulfate (e.g., Neodol® 67S) from an about 20% active solution with about 47 wt % of sorbitan laurate (e.g., SPAN® 20, Aldrich Chemical Co., Milwaukee MN.) at 25° C.

A polymeric column (3.8 cm×27 cm) was dry packed with about 193.2 mL (512 grams) Oklahoma #1 sand, purged with nitrogen (7 psi) then evacuated with a vacuum. Nitrogen purging and subsequent vacuum evacuation was repeated twice. About 80 mL of Nowata crude in about 96.9 mL water was added to the column until the sand was completely saturated with hydrocarbons. The sand pack had a pore volume (PV) of about 97.03 mL, a porosity of about 33%, an absolute permeability to water of about 1.1 darcy, saturation of about 1.03% and an effective permeability to hydrocarbons of about 1.5 darcy. About 104 mL of Nowata produced water (brine from Nowata Oil Field, Okla.) was delivered vertically from the bottom of the column to the top of the column to waterflood the sand pack (e.g., remove hydrocarbons from the sand pack). The produced water flow rate during waterflooding was lower than during the water saturation period. Waterflood flow rate was about 9.5 meter/darcy About 65 mL of hydrocarbons was collected during the water flood. Residual hydrocarbon saturation was determined to be between about 23 volume % and effective permeability to water was about 0.49 darcy.

A pre-polymer solution (0.05 PV) was delivered vertically from the bottom of the column to the top of the column at about 0.1 wt. %. polymer concentration. A 0.2 PV solution (208 mL) of 0.2 wt. % of composition #2, 0.1 wt. % polymer and 0.1 wt. % $Na_2CO_3$ was delivered vertically from the bottom of the column to the top of the column.

After the composition #2/polymer flood, 0.5 PV amount of polymer was delivered vertically from the bottom of the column to the top of the column to control mobility of the hydrocarbons. Flow rate of hydrocarbons through the column and volume of recovered hydrocarbons were monitored during all stages of the test. An average flow rate of about 0.025 mL/sec was determined during the composition #2/polymer flood. Total volume of hydrocarbons recovered from the sand was about 4.9 mL. Total volume efficiency was calculated to be about 33%. A post-polishing step was performed by delivering vertically from the bottom of the column to the top of the column about 1.25 PV of a brine solution.

Example 3

Composition #3 was prepared by mixing about 82 wt. % of a branched $C_{16}$ to $C_{17}$ aliphatic sulfate, sodium salt (Neodol® 67S) from an about 20% active solution with about 18 wt. % of a branched $C_{16}$ to $C_{17}$ aliphatic alcohol (Neodol® 67) at a temperature about 25° C.

A polymeric column (3.8 cm×27 cm) was dry packed with about 197.7 mL (524 grams) Oklahoma #1 sand, purged with nitrogen (7 psi) then evacuated with vacuum. Nitrogen purging and subsequent vacuum evacuation was repeated twice. About 80 mL of Nowata crude in about 93.2 mL water was added to the column until the sand was completely saturated with hydrocarbons. The sand pack had a pore volume of about 93.68 mL, a porosity of about 32%, an absolute permeability to water of about 1.4 darcy, saturation of 1.03% and an effective permeability to hydrocarbons of about 1.6 darcy. About 104 mL of Nowata produced water (brine from Nowata Oil Field, Okla.) was delivered vertically from the bottom of the column to the top of the column to waterflood the sand pack (e.g., remove hydrocarbons from the sand pack). The produced water flow rate during waterflooding was lower than during the water saturation period. Waterflood flow rate was about 9.5 m/d (darcy velocity).

About 55 mL of hydrocarbons was collected during the waterflood. Residual hydrocarbon saturation was determined to be between about 27 volume % and effective permeability to water was about 1.00 darcy.

A pre-polymer solution (0.05 PV) was delivered vertically from the bottom of the column to the top of the column at about 0.1 wt. % concentration. A 0.2 PV solution (214 mL) of 0.1 wt. % composition #3 and 0.1 wt. % polymer was delivered vertically from the bottom of the column to the top of the column.

After the composition #3/polymer flood, 0.5 PV amount of polymer was delivered vertically from the bottom of the column to the top of the column to control mobility of the hydrocarbons. Flow rate of hydrocarbons through the column and volume of recovered hydrocarbons were monitored during all stages of the test. An average flow rate of 0.025 mL/sec was determined during the composition #3/polymer flood. Total volume of hydrocarbons recovered from the sand was about 13.6 mL. Total volume efficiency was calculated to be about 54%. A post-polishing step was performed by delivering vertically from the bottom of the column to the top of the column 1.25 PV of a brine solution.

Figure 5:
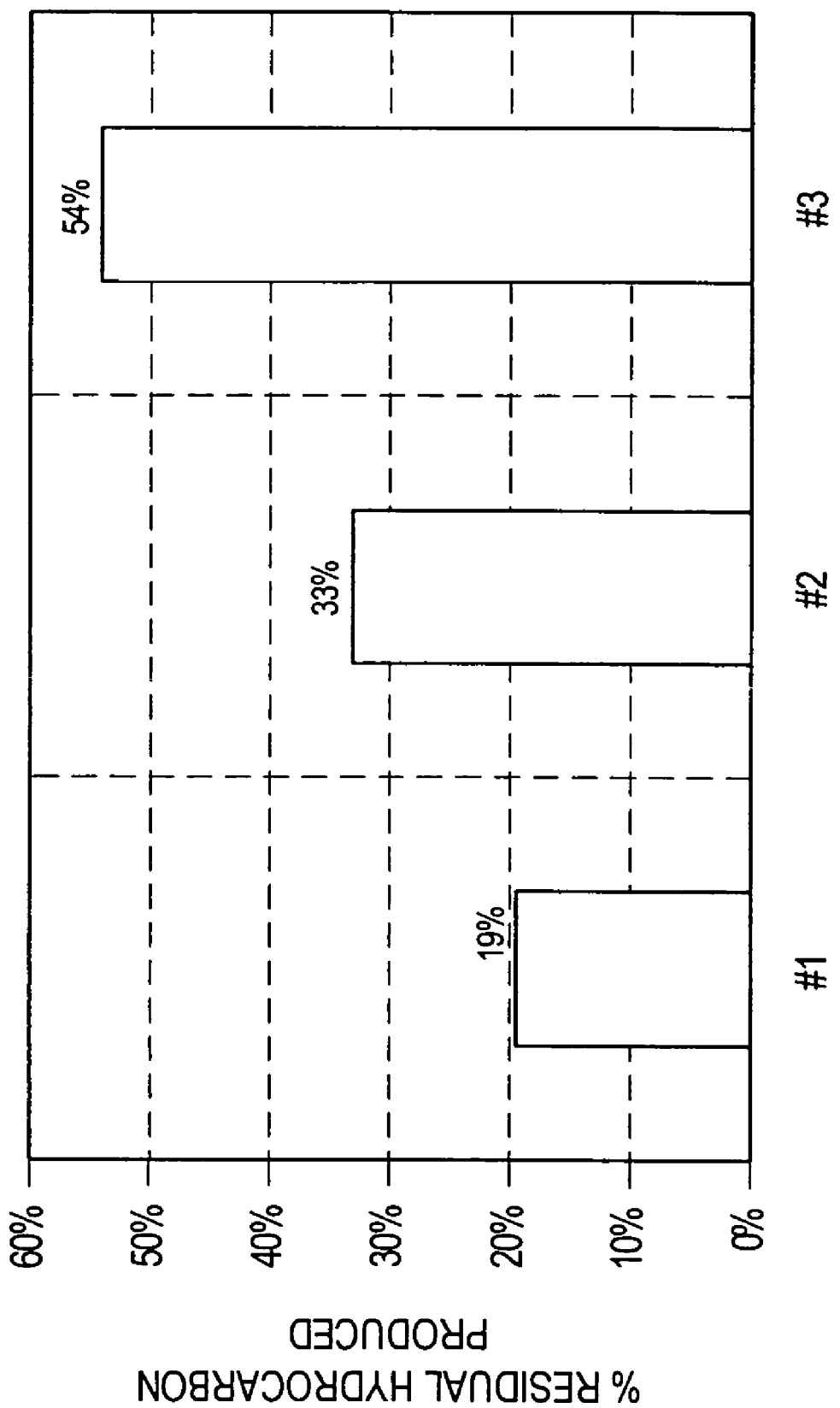
FIG. 5 depicts a graphical representation of embodiments of treating a hydrocarbon containing formation.

Results of the composition/polymer floods are depicted graphically in FIG. 5. At a lower concentration, composition #3 increases residual hydrocarbons production over composition #1 and composition #2 by more than 65% and 39%, respectively.

In this patent, certain U.S. patents, U.S. patent applications and other materials (e.g., articles) have been incorporated by reference. The text of such U.S. patents, U.S. patent applications and other materials is, however, only incorporated by reference to the extent that no conflict exists between such text and the other statements and drawings set forth herein. In the event of such conflict, then any such conflicting text in such incorporated by reference U.S. patents, U.S. patent applications and other materials is specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes am be made in the elements described herein without departing from the spirit and scope o the invention as described in the following claims. In addition, it is to be understood that features described herein independently may, in certain embodiments, be combined.

What is claimed is:

1. A method of treating a hydrocarbon containing formation, comprising:
   providing a composition to at least a portion of the hydrocarbon containing formation, wherein the composition comprises a branched aliphatic anionic surfactant which has a branched aliphatic group with an average carbon number from 10 to 24 and has an average number of branches per aliphatic group of from about 0.7 to about 2.5 and wherein methyl branches represent from about 20 to about 99 percent of the total number of branches present in the branched aliphatic group and is an acid salt of a primary alcohol; and an aliphatic nonionic additive; and
   allowing the composition to interact with hydrocarbons in the hydrocarbon containing formation.

2. The method claim 1, wherein greater than about 50 percent of the branches of the branched aliphatic anionic surfactant are methyl groups.

3. The method claim 1, wherein less than about 10 percent of the branches of the branched aliphatic anionic surfactant are ethyl groups.

4. The method of claim 1, wherein less than about 0.5 percent of the branches of the branched aliphatic anionic surfactant are neither ethyl or methyl groups.

5. The method of claim 1, wherein the aliphatic group of the branched aliphatic anionic surfactant has less than about 0.5 percent aliphatic quaternary carbon atoms.

6. The method of claim 1, wherein the aliphatic nonionic additive has an average carbon number from 10 to 24.

7. The method of claim 1, wherein the composition comprises greater than about 40 wt. % of the branched aliphatic anionic surfactant.

8. The method of claim 1, wherein the composition comprises less than about 60 wt. % of the aliphatic nonionic additive.

9. The method of claim 1, wherein the aliphatic nonionic additive is an alcohol.

10. The method of claim 1, wherein the aliphatic nonionic additive is a sugar based surfactant.

11. The method of claim 1, wherein the branched aliphatic anionic surfactant is a sulfate.

12. The method of claim 1, wherein providing the composition to at least a portion of the hydrocarbon containing formation comprises combining at least a portion of the composition with at least a portion of a hydrocarbon removal fluid to produce an injectable fluid; wherein an amount of the composition is less than about 0.5 wt. % based on the weight of the injectable fluid.

13. The method of claim 1, wherein the hydrocarbon containing formation comprises an average permeability thickness product of less than about 1000 millidarcy feet.

14. The method of claim 1, wherein the hydrocarbon containing formation comprises an average temperature of less than 50° C.

15. The method of claim 1, wherein at least a portion of the hydrocarbon containing formation is oil wet.

16. The method of claim 1, wherein at least a portion of the hydrocarbon containing formation is less than 1000 feet below the earth's surface.

17. The method of claim 1, further comprising waterflooding at least a portion of the hydrocarbon containing formation.

18. The method of claim 1, further comprising:
   waterflooding at least a portion of the hydrocarbon containing formation before providing the composition to the hydrocarbon containing formation; and
   allowing the composition to interact with the water and hydrocarbons.

19. The method of claim 1, further comprising:
   waterflooding at least a portion of the hydrocarbon containing formation before providing the composition to the hydrocarbon containing formation; and
   allowing the composition to interact with at least a portion of the water and at least a portion of the hydrocarbons, wherein the interaction reduces at least a portion of the interfacial tension between the water and at least a portion of the hydrocarbons to a value less than about 0.1 dyne/cm.

20. The method of claim 1, wherein at least a portion of the hydrocarbon containing formation comprises water and wherein a salinity value for the water is less than about 13,000 ppm.

21. The method of claim 1, further comprising providing a hydrocarbon removal fluid to at least a portion of the hydrocarbon containing formation and allowing the hydrocarbon removal fluid to mobilize at least a portion of the hydrocarbons toward a production well.

22. The method of claim 1, further comprising providing a polymer to at least a portion of the hydrocarbon containing formation.

23. The method of claim 1, wherein the aliphatic portion of the aliphatic nonionic additive has an identical chemical structure as the aliphatic portion of the branched aliphatic anionic surfactant.

24. The method of claim 1, wherein the branched aliphatic anionic surfactant has the general structure $(R-Y)_n$ M, where R is a branched long chain aliphatic group having an average carbon number from 10 to 24 and having an average number of branches per aliphatic group of from about 0.7 to about 2.5 and wherein methyl branches represent from about 20 to about 99 percent of the total number of branches present in the branched aliphatic group, Y is $OSO_3^-$ or $OPO_3^-$, M is a metal ion, and n is a number depending on the valency of M, such that the total electrical charge of the composition is zero.

* * * * *